US011831535B2

(12) United States Patent
Williams

(10) Patent No.: US 11,831,535 B2
(45) Date of Patent: Nov. 28, 2023

(54) AUTONOMOUS QUALITY REGULATION FOR DISTRIBUTED LEDGER NETWORKS

(71) Applicant: Arqit Limited, London (GB)

(72) Inventor: David Williams, Surrey (GB)

(73) Assignee: Arqit Limited, Bedford (GB)

(*) Notice: Subject to any disclaimer, the term of this patent is extended or adjusted under 35 U.S.C. 154(b) by 278 days.

(21) Appl. No.: 17/276,005

(22) PCT Filed: Sep. 9, 2019

(86) PCT No.: PCT/GB2019/052509
§ 371 (c)(1),
(2) Date: Mar. 12, 2021

(87) PCT Pub. No.: WO2020/053565
PCT Pub. Date: Mar. 19, 2020

(65) Prior Publication Data
US 2022/0045930 A1 Feb. 10, 2022

(30) Foreign Application Priority Data
Sep. 14, 2018 (GB) ..................... 1815040

(51) Int. Cl.
*H04L 43/50* (2022.01)
*G06F 16/29* (2019.01)
(Continued)

(52) U.S. Cl.
CPC .............. *H04L 43/50* (2013.01); *G06F 16/29* (2019.01); *H04L 9/3239* (2013.01);
(Continued)

(58) Field of Classification Search
CPC ... H04L 43/50; H04L 9/3239; H04L 43/0805; H04L 43/0852; H04L 43/16; H04L 67/10;
(Continued)

(56) References Cited

U.S. PATENT DOCUMENTS

2013/0121178 A1* 5/2013 Mainaud ............... H04L 45/70
370/252
2014/0196054 A1* 7/2014 Brochard ............... G06F 9/505
718/105
(Continued)

FOREIGN PATENT DOCUMENTS

CN 107360206 A 11/2017

OTHER PUBLICATIONS

Djamel Eddine Kouicem et al., "An Efficient Architecture for Trust Management in IoE Based Systems of Systems", 2018 13th Annual Conference on Systems of Systems Engineering (SOSE), IEEE, Jun. 19, 2018, pp. 138-143, XP033382630, DOI: 10.1109/SYSOSE.2018.8428732.
(Continued)

*Primary Examiner* — Hamza N Algibhah
*Assistant Examiner* — James Ross Hollister
(74) *Attorney, Agent, or Firm* — Dentons US LLP

(57) ABSTRACT

Methods, apparatus, and systems are provided for operating a distributed ledger network (100), the distributed ledger network (100) comprising a plurality of nodes (102a-102n, 104a-04m), the plurality of nodes comprising a group of nodes (104), wherein each node in the group of nodes (104) includes functionality for acting as a trusted third party node on a distributed ledger transaction, the method comprising: performing an operating performance test on one or more selected nodes (104a-104m) of the group of nodes (104), wherein the operating performance test comprises sending a plurality of test messages to each selected node (104a-104m) over a predetermined time period; receiving operating performance data associated with each selected node (104a-104m) in relation to the operating performance test; aggregating operating performance statistics for each selected node (104a-104m) based on the received operating perfor-
(Continued)

mance responses; and indicating to the distributed ledger network (100) those selected nodes (104a-104m) satisfying one or more operating performance benchmark(s) for acting as a trusted third party for distributed ledger transactions over the distributed ledger network (100) based on the aggregated operating performance statistics.

27 Claims, 9 Drawing Sheets

(51) Int. Cl.
| | |
|---|---|
| *H04L 9/32* | (2006.01) |
| *H04L 43/0805* | (2022.01) |
| *H04L 43/0852* | (2022.01) |
| *H04L 43/16* | (2022.01) |
| *H04L 67/10* | (2022.01) |
| *H04L 67/53* | (2022.01) |
| *H04L 9/00* | (2022.01) |

(52) U.S. Cl.
CPC ...... *H04L 43/0805* (2013.01); *H04L 43/0852* (2013.01); *H04L 43/16* (2013.01); *H04L 67/10* (2013.01); *H04L 67/53* (2022.05); *H04L 9/50* (2022.05)

(58) Field of Classification Search
CPC ....... H04L 67/53; H04L 9/50; H04L 63/0823; H04L 63/126; H04L 63/10; H04L 41/5009; H04L 43/0817; H04L 43/0864; H04L 43/10; H04L 67/101; H04L 67/1012; H04L 67/1093; G06F 16/29
See application file for complete search history.

(56) References Cited

U.S. PATENT DOCUMENTS

| | | | |
|---|---|---|---|
| 2016/0182346 A1* | 6/2016 | Boyd | H04L 43/06 370/252 |
| 2018/0063238 A1 | 3/2018 | Zhang | |
| 2018/0121909 A1* | 5/2018 | Christidis | G06Q 20/383 |
| 2018/0146061 A1 | 5/2018 | Oberdorfer | |
| 2018/0262414 A1* | 9/2018 | Burbridge | H04L 43/50 |
| 2019/0287107 A1* | 9/2019 | Gaur | G06Q 30/04 |
| 2020/0050691 A1* | 2/2020 | Surampalli | G06F 16/9024 |
| 2020/0051081 A1* | 2/2020 | Valecha | H04W 4/70 |

OTHER PUBLICATIONS

Bo Zhao et al., "Mchain: A Blockchain-Based VM Measurements Secure Storage Approach in IaaS Cloud With Enhanced Integrity and Controllability", IEEE Access, vol. 6, Aug. 1, 2018, pp. 43758-43769, XP011689425, DOI: 10.1109/ACCESS.2018. 2861944.

* cited by examiner

1

AUTONOMOUS QUALITY REGULATION FOR DISTRIBUTED LEDGER NETWORKS

This application is the National Stage filing under 35 U.S.C. 371 of International Application No. PCT/GB2019/052509, filed Sep. 9, 2019, claims the benefit of GB Application No. 1815040.9, filed Sep. 14, 2018, the contents of which are all hereby incorporated by reference herein in their entirety.

The present application relates to a system, apparatus and method(s) for autonomous quality regulation for distributed ledger networks.

BACKGROUND

Early distributed ledger technology (DLT) (e.g. blockchain systems) emerged organically in which the task of approving transactions is decentralised to wallet owners, node operators or miners. Essentially, anyone with the requisite computational power (e.g. nodes) may join into a "crowd sourced" computing system. Typically these participants are anonymous, and have no obligation regarding the quality of service or performance service levels they may provide. Most early blockchain systems (e.g. Bitcoin® and Ethereum®) incentivise nodes to authorise transactions quickly in order to generate fees in a process known as forming a "Consensus". Thus, an anarchic group of random anonymous nodes or systems drive financial transactions collectively. However, if 51% of these nodes were to collude, then there is a risk that they could hijack a blockchain network and, even, steal the value within the blockchain.

DLT has now matured (e.g. CORDA®) such that there has been an explosion of activity with institutions actively researching, testing and investing in this technology. This activity is moving away from the unreliability of the exploration and research phase, which plagued early adopters of blockchain systems (e.g. Bitcoin®) suffered from, and towards targeted delivery and commercialisation of distributed ledger applications in industry, organisations and everyday office life (e.g. Cordite®). Most DLT applications require a distributed ledger network (DLN) with notary nodes or trusted third party nodes that are required to authorise transactions. Each individual DLT application (such as a telecoms marketplace or manufacturing supply chain) must be able to chose how many notary nodes to use, and give preference to the quality and provenance of the notary nodes. Otherwise, there is a fear of consensus skew and/or lost or delayed transactions due to varying levels of performance of the notary nodes and the like.

There is a desire for a reliable mechanism, system and/or process for creating a high quality group of nodes that may act as trusted third party nodes (e.g. a notary group) for distributed ledger transactions and/or DLT applications. There is also a desire for such a mechanism or system to be able to always ensure an availability of reputable node operators, and hence trusted third party nodes to authorise transactions. These are two key aspects for providing a DLN and/or DL application that has integrity in both consensus and processing of transactions.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used to determine the scope of the claimed subject matter; variants and alternative features which facilitate the working of the invention and/or serve to achieve a substantially similar technical effect should be considered as falling into the scope of the invention disclosed herein.

The present disclosure provides a quality regulation functionality for a distributed ledger network (DLN) that is capable of providing an indication whether one or more nodes in a group of nodes satisfy one or more performance benchmarks of the DLN required for these nodes to act as trusted third party. The QRF may be implemented in a decentralised manner on each of the nodes in the group of nodes to provide a self-regulating DLN with an availability of a reliable and high quality group of nodes for acting as trusted third party nodes whilst avoiding consensus skew and/or lost or delayed transactions.

In a first aspect, the present disclosure provides a computer-implemented method for operating a distributed ledger network, the distributed ledger network comprising a plurality of nodes, the plurality of nodes comprising a group of nodes, wherein each node in the group of nodes includes functionality for acting as a trusted third party node on a distributed ledger transaction, the method comprising: performing an operating performance test on one or more selected nodes of the group of nodes, wherein the operating performance test comprises sending a plurality of test messages to each selected node over a predetermined time period; receiving operating performance data associated with each selected node in relation to the operating performance test; aggregating operating performance statistics for each selected node based on the received operating performance responses; and indicating to the distributed ledger network those selected nodes satisfying one or more operating performance benchmark(s) for acting as a trusted third party for distributed ledger transactions over the distributed ledger network based on the aggregated operating performance statistics.

Preferably, the computer-implemented method wherein each selected node receives a plurality of operating performance tests over a predetermined time interval, the computer-implemented method including aggregating the operating performance statistics for each selected node further comprising calculating the operating performance statistics for each selected node based on the frequency at which the received operating performance data associated with the selected node satisfy corresponding target operating performance thresholds in relation to the operating performance benchmark(s).

Preferably, the computer-implemented method wherein each of the operating performance tests are received at random or pseudo-random time instances over the predetermined time interval.

Preferably, the computer-implemented method wherein the operating performance data comprises one or more measurable operational parameters associated with the selected node receiving and processing the test message(s).

Preferably, the computer-implemented method wherein the operating performance data associated with the selected node in relation to the test messages comprises at least one or more measurable operational parameters based on the group of: test message transmission timestamps; test message reception timestamps; latency delays; uptime of a selected node; transaction processing speed; and round-trip-time between one or more nodes associated with the parties and the selected node in relation to the test message; and the like, and/or as the application demands.

Preferably, the computer-implemented method wherein the operating performance benchmark(s) comprise one or more performance benchmark(s) based on the group of: a selected node meeting an availability threshold for the selected node to authorise transactions; a selected node meeting an uptime threshold for the selected node to authorise transactions; a selected node meeting a network reachability threshold; a selected node meeting an communication connection speed threshold; a selected node meeting a transaction processing time threshold; a selected node meeting any other operating performance threshold externally determinable or measurable to the selected node for determining the operating performance of the selected node; and the like, and/or as the application demands.

Preferably, the computer-implemented method wherein the computer-implemented method further comprising determining a selected node satisfies the operating performance benchmark(s) when the operating performance statistics indicate the selected node meets or exceeds a quality metric for each of the operating performance benchmark(s).

Preferably, the computer-implemented method wherein the quality metric is based on a frequency or number of times the selected node satisfies the corresponding operating performance benchmark in relation to the number of test messages received.

Preferably, the computer-implemented method wherein the quality metric is based on a percentage of a time interval, or number of test messages received/sent, the selected node satisfies a performance benchmark expressed in terms of M 9's or MN5, where M>=1.

Preferably, the computer-implemented method wherein the quality metric is based on a probability over a time interval, or number of test messages received/sent, that the selected node satisfies a performance benchmark.

Preferably, the computer-implemented method wherein one or more of the test messages comprises a diagnostic test transaction between two or more parties requiring a node from the group of nodes to act as a third party node, wherein, on receipt of the test message, a selected node from the group of nodes processes the diagnostic test transaction as a third party node between the two or more parties.

Preferably, the computer-implemented method wherein the two or more parties exist or are based on the same node in the distributed ledger network.

Preferably, the computer-implemented method wherein the two or more parties exist or are based on different nodes of the distributed ledger network.

Preferably, the computer-implemented method wherein one or more of the test messages comprises one or more network reachability messages based from the group of: ping messages for determining reachability of the selected node; keep-alive messages for determining a communication link exists with the selected node; any other message or messaging protocol for determining round-trip time in relation to the selected node; any other message or messaging protocol for determining end-to-end delay or one-way delay in relation to the selected node.

Preferably, the computer-implemented method wherein the one or more test messages and responses thereto are configured to determine an estimate of the availability of the selected node for performing transactions of the selected node based determining an end-to-end delay between a party of the two or more parties initiating the transaction with the selected node.

Preferably, the computer-implemented method wherein the one or more test messages and responses thereto are configured to determine an estimate of the transaction processing time of the selected node in relation to a diagnostic test transaction based on round-trip time of the transaction being performed between the two or more parties and the selected node and the end-to-end delay between the two or more parties and the selected node.

Preferably, the computer-implemented method wherein the one or more test messages and responses thereto are configured to determine an estimate of the communication bandwidth for the connection to the selected node in the distributed ledger network based determining an round-trip-time and/or end-to-end delay between the two or more parties in a transaction with the selected node.

Preferably, the computer-implemented method wherein the group of nodes comprises a plurality of subgroup of nodes, each subgroup of nodes associated with a corresponding node operator and each node in the subgroup of nodes operating independently of other nodes in the subgroup of nodes, the method further comprising sending a notification to each node operator as to whether those selected nodes of the subgroup of nodes associated with the node operator satisfy the operating performance benchmark(s).

Preferably, the computer-implemented method wherein the notification comprises diagnostic data representative of the operating performance statistics of the selected nodes in the subgroup of nodes.

Preferably, the computer-implemented method wherein the diagnostic data indicates whether a selected node satisfies the operating performance test.

Preferably, the computer-implemented method wherein the group of nodes comprises a plurality of subgroups of nodes, each subgroup of nodes associated with a corresponding node operator and each node in the subgroup of nodes operating independently of other nodes in the subgroup of nodes, the method further comprising notifying a node operator of those selected nodes in the subgroup of nodes that do not satisfy all of the operating performance benchmark(s).

Preferably, the computer-implemented method wherein the group of nodes comprises a plurality of subgroups of nodes, each subgroup of nodes associated with a corresponding node operator and each node in the subgroup of nodes operating independently of other nodes in the subgroup of nodes, the method further comprising rewarding a node operator by providing a number of tokens to the node operator based on the number of selected nodes in the subgroup of nodes that satisfy all of the operating performance benchmark(s).

Preferably, the computer-implemented method further comprising indicating to the distributed ledger network those selected nodes satisfying one or more operating performance benchmark(s) further comprises ensuring transactions are routed to those selected nodes satisfying one or more operating performance benchmark(s).

Preferably, the computer-implemented method further comprising ensuring transactions are routed further comprises configuring the distributed ledger network to re-route transactions away from those selected nodes indicated as not satisfying one or more of the operating performance benchmark(s).

Preferably, the computer-implemented method further comprising indicating to the distributed ledger network those selected nodes satisfying one or more operating performance benchmark(s) further comprising storing, in a blockchain or distributed ledger, the operating performance statistics for each of the selected nodes and/or whether each of the selected nodes satisfies the one or more operating performance benchmark(s), wherein the blockchain or distributed ledger is accessed by one or more parties of a transaction for selecting a node that satisfies the operating performance benchmark(s) required for acting as a third party node in the transaction.

Preferably, the computer-implemented method wherein the group of nodes comprises at least one type of node from the group of: a super-peer node; a master node; a miner node; a jury node; and a notary nodes; and the like, modification thereof, combinations thereof, and/or as the application demands.

Preferably, the computer-implemented method wherein the distributed ledger network is based on at least one of: a) a CORDA based distributed ledger network and the group of nodes comprises a pool of notary nodes; b) blockchain based distributed ledger network and the group of nodes comprises a pool of miner nodes; and c) any other type of distributed ledger network in which a group of nodes comprises nodes for acting as trusted third parties in a distributed ledger transaction for one or more parties; and the like, and/or as the application demands.

In a second aspect, the present disclosure provides a node in a distributed ledger network comprising a plurality of nodes, the plurality of nodes comprising a group of nodes, wherein each node in the group of nodes includes functionality for acting as a third party node in a transaction, the node configured to implement the computer-implemented method of the first aspect, modifications thereof, combinations thereof, and/or as herein described.

In a third aspect, the present disclosure provides a distributed ledger network comprising a plurality of nodes, the plurality of nodes comprising a group of nodes, wherein each node in the group of nodes includes functionality for acting as a third party node in a transaction, wherein one or more nodes of the plurality of nodes further comprises functionality configured to implement the computer-implemented method of the first aspect, modifications thereof, combinations thereof, and/or as herein described or otherwise and the like, and/or as the application demands.

In a fourth aspect, the present disclosure provides an apparatus comprising a processor, a memory, and a communication interface, the processor connected to the memory and communication interface, wherein the apparatus is configured to implement the of the first aspect, modifications thereof, combinations thereof, and/or as herein described or otherwise and the like, and/or as the application demands.

In a fifth aspect, the present disclosure provides a computer readable medium comprising instruction program code stored thereon, which when executed on a processor, causes the processor to implement the computer-implemented method of the first aspect, modifications thereof, combinations thereof, and/or as herein described and the like, and/or as the application demands.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
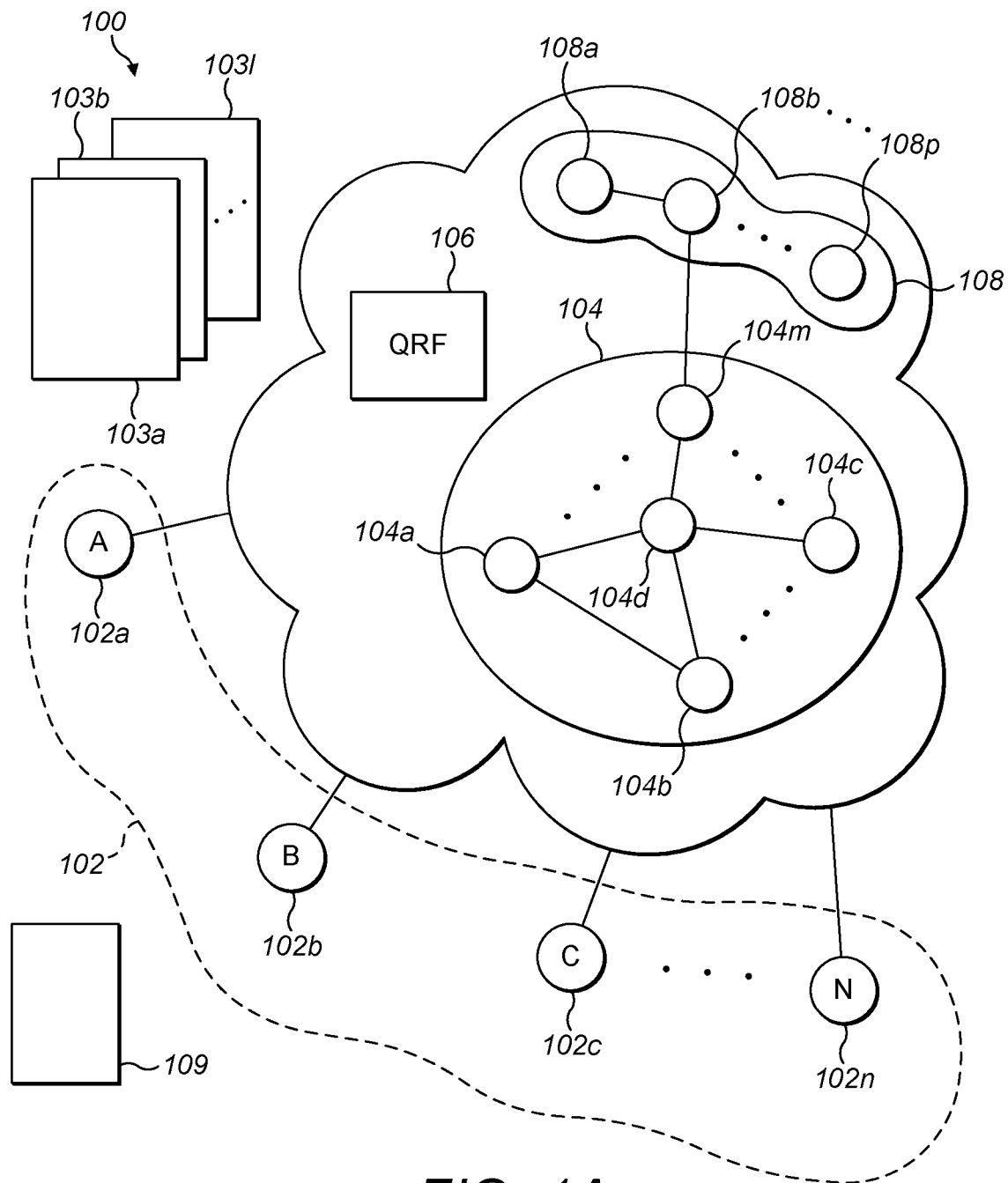
FIG. 1a is a schematic diagram illustrating an example distributed ledger network (DLN) including a quality regulation functionality (QRF) according to the invention.

Common reference numerals are used throughout the figures to indicate similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The inventors propose quality regulation functionality for distributed ledger networks/systems (DLNs) that advantageously retains the benefits of decentralised/distributed systems in relation to immutability of transactions, maintaining consensus of transactions whilst minimising consensus skew and lost or delayed transactions by enhancing performance diagnosis and ensuring a particular standard/level of service amongst a group of nodes in a DLN that are required or configured to act as trusted third party nodes in distributed ledger transactions for one or more parties of the DLN.

A distributed ledger transaction or transaction may comprise or represent an exchange of information between pairs and groups of parties such as, by way of example but not limited to, pairs and/or groups of users, pairs and/or groups of vendors, and/or pairs and/or groups of users and vendors. For example, a transaction may be between two or more users or parties of the DLN that wish to use distributed ledger technology and the like. Examples of transactions according to the invention may include, by way of example only but is not limited to, smart-contract transactions; electronic auction transactions; back-office settlement systems to process trades, transfers and other financial transactions; and/or transactions involving a sale, swap, auction, bid, exchange, distribution of information, cryptocurrency payments/transactions, or other transaction which requires supervision and trust between parties to occur, a transaction that requires authorisation or validation, or any other transaction between parties or the like.

A distributed ledger node (also referred to herein as a node) comprises or represents a process, hardware operating node software, computing apparatus or device and/or a server configured to perform distributed ledger processing function(s) in relation to a transaction, parts of a transaction, and/or one or more transactions, subparts thereof and the like for submission to and/or retrieval from a distributed ledger and the like. Examples of distributed ledger nodes include user nodes used by one or more parties to a transaction, super-peer nodes; master node; miner node; jury node; notary nodes; any node acting as a trusted third party node in a distributed ledger transaction; and/or any other node that performs a function or has a function in a distributed ledger network or system and the like.

A trusted third party node comprises or represents a distributed ledger node that has a level of trustworthiness, trust and/or security such that one or more parties to a distributed ledger transaction that may not trust each other to agree to use, trust and/or allow the distributed ledger node to act as, by way of example only but is not limited to, a trusted third party, witness, notary or notary node, jury or jury node, authenticator, validator, verifier, and the like in relation to operations and/or parts of the distributed ledger transaction enabling one or more untrusting parties to transact with each other.

A node operator may comprise or represent an entity that is associated with operating one or more distributed ledger node(s), node(s) and/or a subgroup of nodes, the subgroup of nodes including one or more node(s) or a multiplicity of nodes that form a portion or at least a part of a distributed ledger network. For example, one or more nodes in the subgroup of nodes associated with a node operator may operate independently of other nodes in the subgroup of nodes and/or operate independently of other nodes in other subgroups of nodes of other node operators. The nodes in the subgroup of nodes may be trusted third party (TTP) nodes that are used to form, by way of example only but is not limited to, a notary or jury function or a notary/jury in which each of the TTP nodes in the subgroup of nodes operate independently of other nodes in the subgroup of nodes and/or operate independently of other nodes in other subgroups of nodes of other node operators that may also be used to form a notary or jury function or as the application demands. Examples of a node operator may include, by way of example only but is not limited to, an entity that owns a node or a subgroup of nodes, an operator of a node or a subgroup of nodes, and/or a third party provider (TPP) contracted to operate one or more nodes or one or more subgroups of nodes on behalf of the entity owning the node or subgroup of nodes; and the like.

For example, the invention relates to a quality regulation function (QRF) for DLNs monitors and performs tests on distributed ledger nodes from a group of nodes, which are configured to act as trusted third party nodes in distributed ledger transactions. The QRF may remotely determine status of each of the nodes in the group of nodes in relation to live operating performance parameters including, by way of example only but not limited to: latency, uptime, transaction processing speed, availability, communication bandwidth available to the nodes, and any other performance parameter. The QRF may compare the performance of each nodes in the group of nodes with predetermined node performance benchmark(s) (PB(s)) associated with the operating performance parameters. The PB(s) are set to ensure all nodes in the group of nodes meet or satisfy an agreed or certain level of performance. The QRF may use performance tests, which may include one or more test messages, such as network reachability messages (e.g. pings, keep-alive etc.) and/or test distributed ledger transactions, sent to nodes for externally measuring, estimating performance parameters for determining node performance status in relation to the PB(s) over a predetermined period of time (e.g. hourly, daily, weekly, monthly). The PB result(s) may be used by the QRF for determining non-operable nodes and/or poorly performing nodes (over time) such as nodes not satisfying or passing the appropriate PB(s). For example, the QRF may determine one or more node(s) not passing the PB(s) for, by way of example only but is not limited to, 95% of the time or the predetermined period of time in order to meet/satisfy acceptable predetermined node PB(s). As a result of non-operable nodes and/or poorly performing nodes, the QRF may be configured to divert or route transactions away from nodes determined to be non-operational at any instant, or divert or route transactions (or transaction traffic) away from nodes that are demonstrably underperforming PB(s). The QRF may also send fault or diagnostic messages/notifications to node operators and/or network managers. The QRF may also influence node reward levels and/or determine granting of awards, degree of award, timing of award independent upon remote technical determinations relating to node operations. The QRF provides the advantage of network management that provides an increase in the number of reliable nodes for guarding against consensus skew, which can become an issue when a relatively small number of the total node population dominates consensus decisions. The QRF by improving the numbers of reliable nodes provides the further advantage(s) of rapid node fault diagnosis and/or protection of the integrity of the distributed ledger(s) of the DLN (e.g. blockchain, distributed ledgers and the like) in relation to lost or delayed transaction recordal by ensuring critical nodes maintain a predetermined standard or level of performance.

FIG. 1a is a schematic diagram illustrating an example distributed ledger network (DLN) 100 according to the invention. The DLN 100 includes a plurality of nodes 102a-102n, 104a-104m operable for using and/or maintaining one or more distributed ledger(s). The plurality of nodes 102, 104 and/or 108 are communicatively coupled together. For example, the plurality of nodes 102, 104, and/or 108 of DLN 100 may be configured to form, by way of example only but is not limited to, a peer-to-peer communication network or other suitable communication network for using and/or maintaining one or more distributed ledger(s) 103a-103l. The plurality of nodes 102, 104, and/or 108 may include, by way of example only but is not limited to, a group of user nodes 102a-102n and a group of DLN nodes 104a-104m, and a group of other nodes 108a-108p. The DLN 100 also includes quality regulation functionality (QRF) 106 for monitoring, regulating and ensuring that at least the group of DLN nodes 104 satisfy or at least meet certain performance benchmarks to ensure the security, integrity and/or quality of operation of the DLN 100 and also the distributed ledger(s) 103a-103l.

The user nodes 102a-102n may each be associated with one or more users or parties (e.g. user/party A to N) that may use one or more of the distributed ledger(s) 103a-103l of the DLN 100 by performing transactions between each other. The group of DLN nodes 104 or 104a-104n may be operable to assist in maintaining the distributed ledger(s) 103a-103l by authorising recording of transactions and/or progress of transactions between one or more parties or users associated with the user nodes 102a-102n. Each of the DLN nodes 104a-104m includes functionality for acting as a trusted third party node on a distributed ledger transaction associated with one or more parties and is responsible for maintaining the distributed ledger in which the corresponding transactions or progress thereof are recorded. For example, a DLN node 104a may be selected to act as a trusted third party for a distributed ledger transaction between party A and party B of user nodes 102a and 102b, respectively. For each step of the distributed ledger transaction performed between party A and B, the user nodes 102a and 102b communicate with the DLN node 104a, which acting as the trusted third party, monitors, authorises/authenticates each step of the distributed ledger transaction performed between party A and B until completion of the transaction. Each stage or part of the transaction may be recorded and securely stored in a distributed ledger 103a.

The QRF 106 is operable for communicating with at least the group of DLN nodes 104 to ensure that these nodes meet a minimum standard or level of operating performance for ensuring the quality and integrity of the one or more distributed ledger(s) 103a-103l and transactions thereof of the DLN 100. A set of performance benchmark(s) (PB(s)) may be used to assess whether the DLN nodes 104 meet the minimum standard or level of performance required for acting as third party nodes in transactions. The QRF 106 may control the sending of a plurality of performance tests to each of the DLN nodes 104a-104m for assessing whether these nodes satisfy one or more PB(s) (e.g. communication bandwidth, latency, transaction processing speed, availability, network reachability and the like). Each PB describes an operating performance type and an associated minimum performance level or threshold based on the operating performance type that a DLN node is meant to satisfy or meet in order for that DLN node to continue acting as a third party in a transaction associated with one or more party(ies).

For example, the PB(s) may be based on one or more PB(s) types and thresholds from the group of: node availability in which a selected node is required to meet an availability threshold for the selected node to authorise/process transactions; node uptime in which a selected node is required to meet an uptime threshold for the selected node to authorise/process transactions; network reachability in which a selected node is required to meet a network reachability threshold; communication connection speed or bandwidth in which communications with the selected node is required to meet a particular communication connection speed or bandwidth threshold; transaction processing time in which a selected node is required to meet a transaction processing time threshold; any other operating performance parameter or PB type in which a selected node is required to meet the associated operating performance threshold. The QRF 106 or any other node may be configured to externally determine and/or measure operating performance data (e.g. timestamps etc.) when the selected DLN node performs or processes the operating performance test. This operating performance data may be aggregated as performance statistics in relation to each PB and used for assessing whether the selected DLN node meets or satisfies the corresponding PB.

The QRF 106 may select a DLN node from the group of DLN nodes 104 and send a node operating performance test to determine the operating performance of the selected node. The node operating performance test may include sending a plurality of test messages to each of the selected DLN nodes 104a-104m over a predetermined time period (e.g. a number of hours, days, months etc.)

The QRF 106 may receive or measure responses from each selected DLN node based on the performance test(s). Each performance test may include different types of test message(s) for testing different aspects of the operating performance of the selected DLN node. The responses or operating performance data measured from each selected DLN node in relation to the test message(s) may be used to aggregated operating performance statistics in relation to each PB. The test message(s) may be configured to elicit, measure or determine the responses of the selected DLN node based on at least one or more measurable operational parameters from the group of: test message transmission timestamps; test message reception timestamps; latency delays; uptime of a selected node; transaction processing speed; end-to-end times between QRF 106 and the selected DLN node; round-trip-time between one or more nodes associated with the parties and the selected node in relation to the test message; and/or any other operating performance data that may be measurable when the selected DLN node process(es) a performance test and/or one or more test message(s) associated with the performance test.

Initially, the number of test messages and/or the predetermined period of time may be determined based on: a) the different types of PB(s) that the selected node is to be assessed against; and/or b) the required response sample size for aggregating performance statistics in relation each PB. This is to ensure that the selected DLN node may be statistically assessed. Once performance statistics associated with a PB based on a suitable response sample size have been aggregated/accumulated, the selected DLN node may be assessed based on that PB. If a selected DLN node fails at least one PB, that DLN node may be considered to not satisfy the PB(s), which may be indicated to the DLN 100. If a selected DLN meets or exceeds all of the PB(s), then this will be indicated to the DLN 100. The QRF 106 will continue sending performance tests to each selected DLN node over further predetermined time periods for updating that node's performance statistics and for re-assessing whether that selected DLN node meets or satisfies the PB(s). New DLN nodes may come on line in the DLN 100, and so the QRF 106 may be configured to aggregate performance statistics in relation to the PB(s) for each of these DLN nodes. Thus, the indication of whether or not a selected DLN node from the group of DLN nodes 104 that satisfies the PB(s) is continually or regularly updated. These performance tests and PB assessments may recur indefinitely and/or as long as the selected DLN node is part of the DLN 100 for acting as a third party node in transactions for one or more parties.

The QRF 106 monitors the response(s) from each DLN node 104a-104m in relation to the one or more performance tests and aggregates performance statistics associated with assessing the PB(s) based on the responses. The QRF 106 assesses the performance statistics of each of the DLN nodes 104a-104m based on the minimum performance level of each PB(s). The QRF 106 may identify or indicate to the DLN 100 those DLN nodes 104a-104m that satisfy the PB(s). The indication to the DLN 100 may be used to automatically route transaction traffic towards those DLN nodes 104a-104m that satisfy the PB(s). The identification or indication may include generating a list of data 109 representative of those DLN nodes 104a-104m that satisfy the PB(s) and/or those DLN nodes 104a-104m that do not satisfy the PB(s). The generated list may be made accessible or published to the plurality of nodes 102, 104 and/or 108 of the DLN 100, or any other suitable node of the DLN 100, for use in selecting those nodes that may act as trusted third parties in a distributed ledger transaction for one or more party(ies). In this manner, the transaction traffic may be routed to only those DLN nodes 104a-104m that satisfy the PB(s). The QRF 106 may be configured to be implemented in a centralised, decentralised and/or hybrid centralised/decentralised manner within the DLN 100.

Figure 1B:
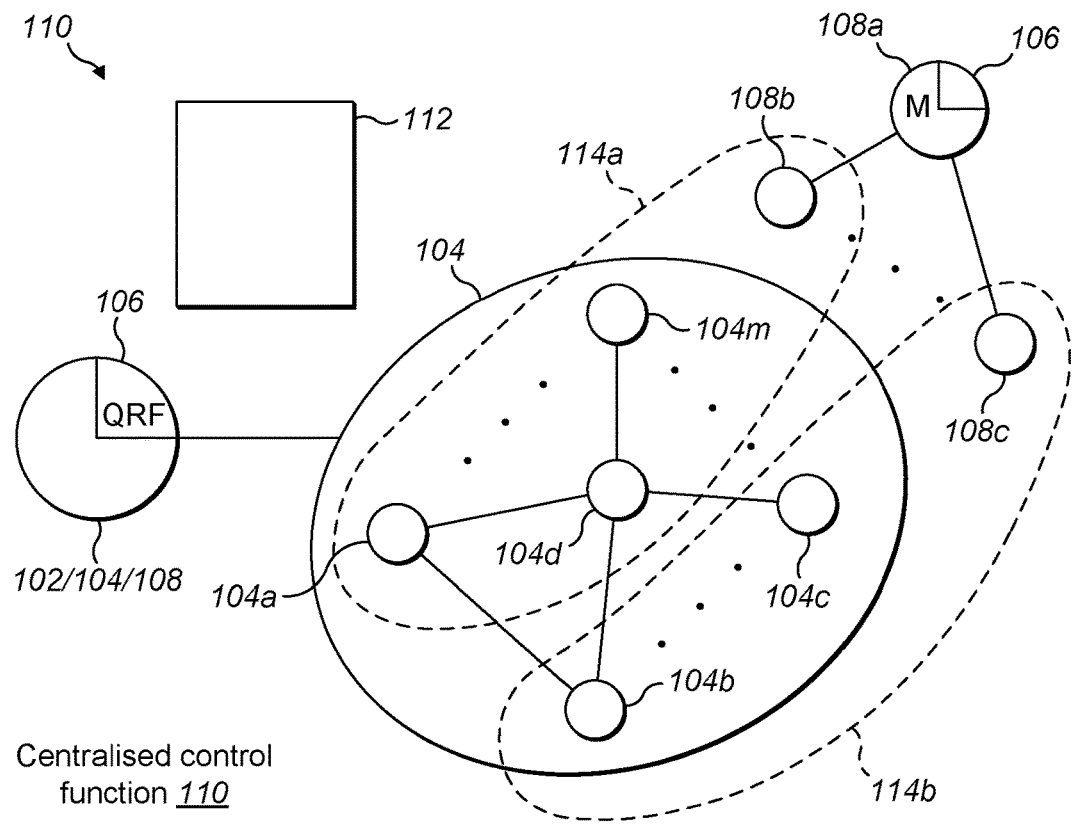
FIG. 1b is a schematic diagram illustrating an example DLN using centralised QRF and hybrid centralised/distributed QRF according to the invention.

FIG. 1b is a schematic diagram illustrating a DLN 110 implementing QRF 106 according to the invention in a centralised manner. In this case, a particular node 102, 104 or 108 of the DLN may be configured to implement the QRF 106. The particular node 102, 104 or 108 may be any node from the group of: user node; DLN node; notary node; master node; super-peer node; or any other suitable node or suitable one or more nodes of the DLN 100 that may be used to perform the QRF 106 in relation to a group of DLM nodes 104 according to the invention. In this example, a centralised node of the DLN that includes QRF 106 is configured to determine, identify and indicate to the DLN 100 data representative 112 of those DLN nodes 104 that satisfy the performance benchmark(s) for acting as a third party node in a transaction for one or more party(ies). The data representative of DLN nodes 104 that satisfy the PB(s) may include, by way of example only but is not limited to, a list of whether DLN nodes 104 satisfy the PB(s); a database/record indicating whether the DLN nodes 104 satisfy the PB(s); a PB distributed ledger 112 recording and/or storing an indication of whether DLN nodes 104 satisfy the PB(s). The Although a centralised implementation of QRF 106 may be desirable in some circumstances, as the users and organisations that use distributed ledgers increases the DLN 100 will also need to grow to keep up with demand. Thus, the demand for trusted third party nodes will increase and hence the number of DLN nodes 104 that satisfy the required performance benchmarks for acting as third parties will also increase. Thus, a centralised implementation of QRF 106 may not fully scale as demand and the number of DLN nodes 104 increase.

In another example, QRF may be implemented in a hybrid centralised/distributed hierarchical manner in which several nodes of the DLN 100 may include QRF 106, so-called QRF nodes 108a-108c, which may include a master QRF node 108a and several or one or more local or slave QRF nodes 108b or 108c. This may assist a centralised QRF 106 to scale as the DLN 100 and/or the number of DLN nodes 104 increase due to user demand for DLT services and ledgers etc. Each of the local QRF nodes 108b or 108c may assess subgroups of DLN nodes 114a or 114b, respectively, assigned to them and transmit the results of which (e.g. indications of those DLN nodes in the subgroup that are satisfying the performance benchmarks) to the master QRF node 108a for compilation, finalisation and publishing an indication of data representative of all those DLN nodes 104 of the DLN 100 satisfying and/or not satisfying the performance benchmark(s).

In this example, the group of DLN nodes 104 may be split into multiple subgroups of DLN nodes 114a and 114b (e.g. geographical regions of DLN nodes, or subnets of DLN nodes, or any other suitable division of DLN nodes), and one or more local QRF nodes 108b or 108c are each assigned to a subgroup of DLN nodes 114a or 114b, respectively. These local QRF nodes 108b and 108c regularly initiate and send performance tests to their assigned subgroup of DLN nodes 114a and 114b, receive responses therefrom, aggregate performance statistics, assess the DLN nodes in their assigned subgroups in relation to the PB(s), and provide an indication of those DLN nodes in the corresponding subgroup of DLN nodes 114a or 114b that satisfy and/or do not satisfy the PB(s) to the master QRF node 108a. The master QRF node 108a may receive the indications from each of the local QRF nodes 108b and 108c for compilation, finalisation and publishing an indication of data representative of all those DLN nodes 104 of the DLN 100 satisfying and/or not satisfying the PB(s).

Figure 1C:
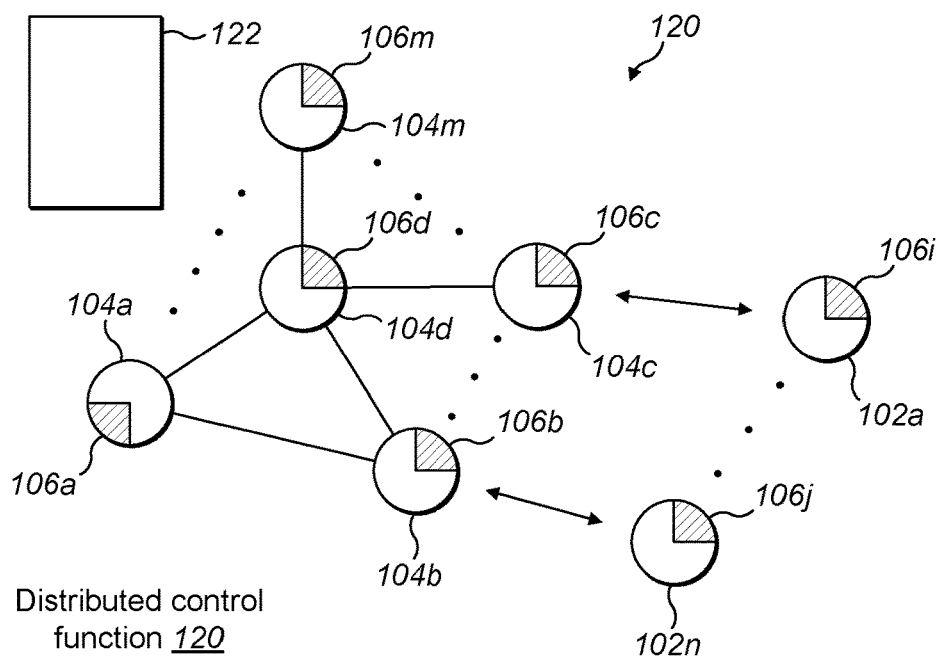
FIG. 1c is a schematic diagram illustrating an example DLN using decentralised/distributed QRF according to the invention.

FIG. 1c is a schematic diagram illustrating a DLN 120 that implements QRF 106 according to the invention in a decentralised and self-regulating manner. The DLN 120 includes a plurality of the nodes 104a-104m and/or 102a-102n that each may include QRF 106 for assessing whether at least the DLN nodes 104a-104m meet or satisfy the PB(s) in order for these nodes to act as third party nodes in a transaction. This means that the nodes in the DLN 120 may be configured to regulate each other in a decentralised manner. Each of the nodes 104a-104m and/or 102a-102n with QRF 106 may each select a set of DLN nodes 104a-104m for performance testing and provide an indication to the DLN 120 of whether the selected set of DLN nodes 104a-104m satisfy the PB(s) for acting as a trusted third party node in a transaction.

Each of the plurality of nodes 104a-104m and/or 102a-102n that include a QRF 106 may called a QRF node. Each of the QRF nodes 104a-104m and/or 102a-102m are configured by their QRF 106 to send performance tests to a selected set of other nodes in the plurality of nodes 104a-104m and/or 102a-102n to determine which of the selected set of nodes satisfy the required operating PB(s) for acting as a trusted third party in a transaction. Each QRF node may select one or more nodes from the plurality of nodes 104a-104m and/or 102a-102n for performance testing based when last those nodes satisfied or did not satisfy the operating PB(s) in a similar manner as describe with reference to FIGS. 1a-1b. The selection of DLN nodes 104a-104m for performance testing may be based on any one or more selection techniques from the group of: a random selection of a set of DLN nodes 104a-104m; a selection of a set of DLN nodes 104a-104m determined to have their indication of whether they satisfy the operating PB(s) for acting as trusted third party node in a transaction updated; a selection from a set of one or more DLN nodes 104a-104m local or in the vicinity of said each QRF node; a selection from a set of DLN nodes 104a-104m from the DLN nodes 104a-104m that have not been tested with in a predetermined testing time interval; and/or any other method of selecting the DLN nodes 104a-104m to ensure all DLN nodes 104a-104m have been tested and an indication provided to the DLN 120 of whether the DLN nodes 104a-104m satisfy the operating PB(s) for acting as a trusted third party node in a transaction.

Each QRF node 104a-104m and 102a-102n may submit the performance test results or an indication to the DLN 120 of at least those selected DLN nodes 104a-104m satisfying one or more operating PB(s) by recording and/or storing these in a blockchain or distributed ledger 122 associated with the operating PB(s). This may include storing and/or recording the operating performance statistics for each of the selected DLN nodes 104a-104m and/or whether each of the selected DLN nodes 104a-104m satisfies the one or more operating PBs(s). In order for the test results from each QRF node 104a-104m and/or 102a-102n to be accepted, entered and/or recorded into the PB blockchain and/or the PB distributed ledger, consensus is required amongst the QRF nodes 104a-104m and/or 102a-102n, which provides a self-regulating mechanism to ensure and/or reduce the likelihood any one of the QRF nodes 104a-104m and/or 102a-102n are acting in a malicious or untrustworthy manner. If a QRF node is acting in a malicious and/or untrustworthy manner, then those test results from such a QRF node will most likely not be accepted because these test results will be vetted by other QRF nodes during consensus, which will have contra-indicating test results in relation to the tested nodes. The PB blockchain or PB distributed ledger 122 may be accessible and/or accessed by the user nodes 102a-102n of one or more parties to a transaction for selecting at least one DLN node 104a-104m that satisfies the operating PB(s) required for acting as a third party node in the transaction. The PB blockchain or PB distributed ledger 122 may also be accessible and/or accessed by other nodes 104a-104m, 102a-102n and/or 108a-108p of the DLN 120 when they require at least one DLN node 104a-104m that satisfies the operating PB(s) required for acting as a third party node in a transaction or for any other reason.

Although user nodes 102a-102n may include a QRF 106 and be part of the self-regulation mechanism of the DLN nodes 104a-104m, the user nodes 102a-102n may not be suitable for determining whether DLN nodes 104a-104m meet the required PB(s) for acting as third party nodes. Instead, the group of DLN nodes 104a-104m may be configured to perform the self-regulation function because DLN nodes 104a-104m are expected to satisfy one or more PB(s) and act as trusted third party nodes, which may be leveraged for performing QRF 106.

Figure 1D:
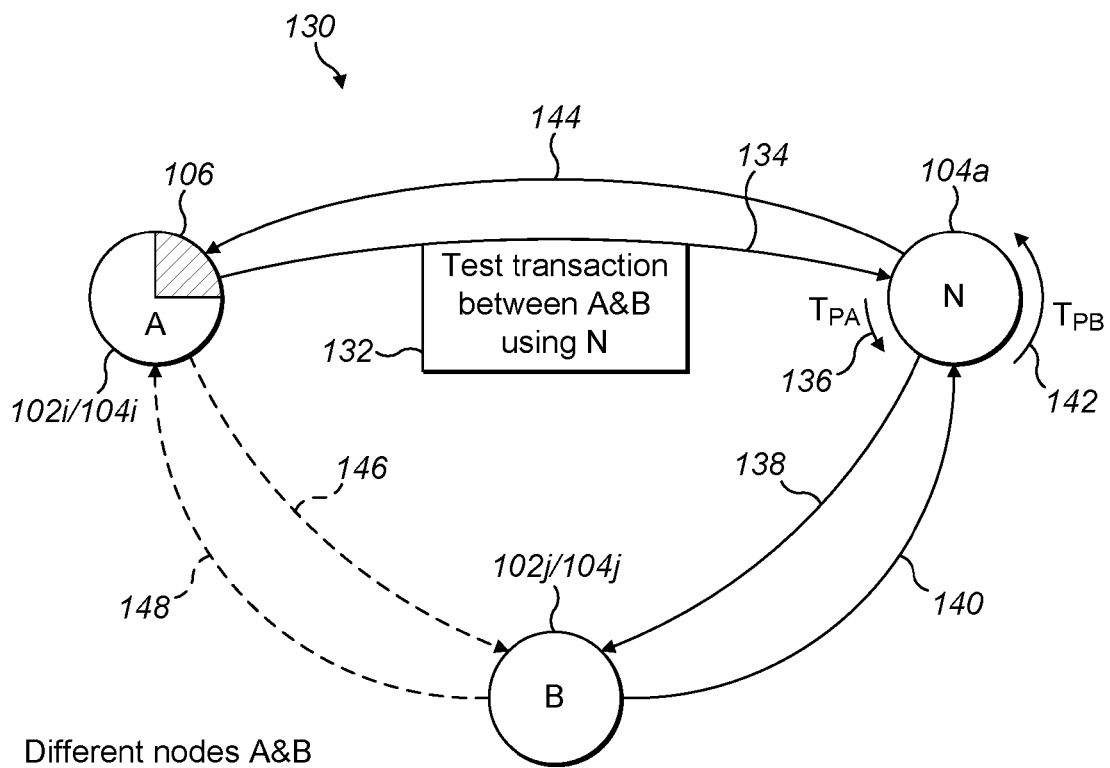
FIG. 1d is a schematic diagram illustrating an example QRF performance test according to the invention.

FIG. 1d is a schematic diagram illustrating an example QRF performance test 130 according to the invention in DLN 100 of FIG. 1a, in which the performance test is based on two or more parties existing or being based on different user nodes of the DLN 100. The QRF performance test 130 may be performed by any one of nodes 104a-104m, 102a-102n and/or 108a-108p of DLN 100 that may include QRF 106, so-called QRF nodes. In this example, a first QRF node 102i/104i and a second QRF node 102j/102j may be used in the performance test of DLN node 104a. The QRF performance test 130 may be based on the sending of one or more of test messages to DLN node 104a. One of the test messages may be based on diagnostic test transaction 132 to enable the QRF nodes 102i/104i and/or 102j/104j to measure and/or determine operating performance statistics from the responses of the DLN node 104a processing the diagnostic test transaction 132. The diagnostic test transaction 132 may be between two or more parties (e.g. party A and party B) that require a node from the group of DLN nodes 104a-104m of DLN 100 to act as a third party node in the transaction. In this case, the first QRF node 102i/104i may act as party A and the second QRF node 102j/104j may act as party B in the diagnostic test transaction 132.

In addition to the diagnostic transaction test message 132, the test message(s) of the QRF performance test 130 may further include one or more network reachability messages based from the group of: ping messages for determining reachability of the selected DLN node 104a; keep-alive messages for determining a communication link exists with the selected DLN node 104a; any other message or messaging protocol for determining round-trip time in relation to the selected DLN node 104a; any other message or messaging protocol for determining end-to-end delay or one-way delay in relation to the selected DLN node 104a.

The PB(s) may be based on: a) the selected DLN node 104a being available (e.g. node availability) to receive transactions based on an availability threshold (e.g. X percentage of the time) or node uptime; b) communication connection speed or bandwidth in which communications between the QRF nodes 102i/104i and/or 102j/104j with the selected DLN node 104a are required to meet a particular communication connection speed or bandwidth threshold; c) transaction processing time in which the selected DLN node 104a is required to meet a transaction processing time threshold or maximum transaction processing speed or latency in processing a transaction; and the like.

In the present example, in operation 134 of the QRF performance test 130, the first QRF node 102i/104i acting as party A may select DLN node 104a and send a diagnostic test transaction 132 towards second QRF node 102j/104j acting as party B, in which DLN node 104a is selected to act as a trusted third party in relation to the diagnostic test transaction 132. The first QRF node 102i/104i may also record one or more time-stamps for sending/receiving test messages and response(s) thereto. In this case, a diagnostic test transaction start time-stamp may be recorded. Furthermore, the first QRF node 102i/104i may also send one or more network reachability test messages in operation 134 to determine end-to-end delay between QRF node 102i/104i and DLN node 104a; or further time-stamps for determine one or more operating performance statistics in relation to the PB(s). In operation 136, the DLN node 104a processes the diagnostic test transaction 132 in relation to party A, which results in a first processing delay in relation to party A (e.g. $T_{PA}$), prior to sending to party B.

In operation 138, the DLN node 104a sends the second QRF node 102j/104j acting as party B the processed diagnostic test transaction 132 in relation to party A. The second QRF node 102j/104j may record one or more time-stamps for receiving/sending test message(s), response(s) to test message(s) and/or response(s) from DLN node 104a. In this case, the second QRF node 102j/104j may record at least a time-stamp for receiving the processed diagnostic test transaction 132 from DLN node 104a. The second QRF node 102j/104j acting as party B may then "process" the received diagnostic test transaction 132 accordingly and, in operation 140, send party B's response to the diagnostic test transaction 132 from DLN node 104a for further processing at DLN node 104a. In addition, the second QRF node 102j/104j may also send one or more network reachability test messages in operation 140 to determine end-to-end delay between QRF node 102j/104j and DLN node 104a; or further time-stamps for use in determining one or more operating performance statistics in relation to the PB(s).

In operation 142, the DLN node 104a processes the diagnostic test transaction 132 response from party B (or in relation to party B), which results in a second processing delay in relation to party B (e.g. $T_{PB}$), prior to sending the processed diagnostic test transaction 132 to QRF node 102i/104i acting as party A. In operation 144, the DLN node 104a sends the processed diagnostic test transaction 132 in relation to parties A and B back to QRF node 102i/104i acting as party A. The QRF node 102i/104i receives the processed diagnostic test transaction 132 in relation to parties A and B from DLN node 104a and may record an end time-stamp, marking the end of this part of the QRF performance test 130. The first and second QRF nodes 102i/104i and 102j/104j may optionally communicate with each other in operations 146 and 148 for exchanging time-stamp information in relation to operations 134, 138, 140, 144. In this manner, either: the first QRF node 102i/104i may determine operating performance statistics in relation to the PBs based on the time-stamp information from both QRF nodes 102i/104i and 102j/104j; the second QRF node 102j/104j may determine operating performance statistics in relation to the PBs based on the time-stamp information from both QRF nodes 102i/104i and 102j/104j; or both QRF nodes 102i/104i and 102j/104j may determine operating performance statistics in relation to the PBs based on the time-stamp information received from each other and recorded during the QRF performance test 130 associated with the diagnostic test transaction 132.

The time-stamps recorded by the first and second QRF nodes 102i/104i and 102j/104j may be used to determine, by way of example only but is not limited to, the round-trip time for the DLN node 104a processing the diagnostic test transaction; end-to-end times between each QRF node 102i/104i or 102j/104j and DLN node 104a. These may be useful in determining an instance or sample estimate of operating performance data associated with operating performance statistics/parameters in relation to the PBs. The PBs being based on, by way of example only but is not limited to, the availability and/or uptime of the DLN node 104a; transaction processing time of the DLN node 104a; and/or communications bandwidth/speed of the communication link(s) used or available to the DLN node 104a; and/or any other operating performance measure of the DLN node 104a. The instance or a sample estimate of operating performance data of the one or more operating performance statistic(s) may be aggregated with or used to update the corresponding one or more operating performance statistic(s) in relation to each of the PB(s).

QRF performance test 130 may be performed a plurality of times, thus a plurality of operating performance tests or test message(s) at different time instances are performed with DLN node 104a. The plurality of operating performance tests may be performed over a predetermined time interval, or a number of times to enable the operating performance statistics in relation to the PBs to be statistically relevant/significant. The instance or sample of each of the operating performance statistics/parameters after each performance test may be aggregated to form corresponding the operating performance statistics for each selected node. In an example, the instances or samples determined from the performance tests associated with each operating performance statistic in relation to each PB may be used for calculating the operating performance for the DLN node 104a based on the frequency at which the received operating performance data associated with the selected DLN node 104a satisfy corresponding target operating performance thresholds in relation to the operating PB(s).

The diagnostic transaction test message 132 and/or network reachability messages and responses thereto may allow the QRF nodes 102i/104i and/or 102j/104j to determine an estimate of the availability of the selected DLN node 104a for performing transactions of the selected node based determining an end-to-end delay between each of the QRF node(s) 102i/104i and 102j/104j acting as party A and party B performing the transaction with DLN node 104a. The diagnostic transaction test message 132 and/or network reachability messages and responses thereto may allow the QRF nodes 102i/104i and/or 102j/104j to determine an estimate of the transaction processing time of the selected DLN node 104a in relation to a diagnostic test transaction 132 (and/or network reachability messages) based on round-trip time of the diagnostic test transaction 132 being performed between the nodes of the two or more parties of the diagnostic test transaction 132 (e.g. between QRF nodes 102i/104i as party A and 102j/104j as party B) and the selected DLN node 104a and the end-to-end delay between the nodes of the two or more parties and the selected DLN node 104a. Furthermore, the one or more test messages and responses thereto may be configured to determine an estimate of the communication bandwidth of the communication link or connection the selected DLN node 104a has with the DLN 100 based determining round-trip-time and/or end-to-end delay between two or more parties in a transaction 132 with the selected DLN node and/or network reachability test message(s).

Figure 1E:
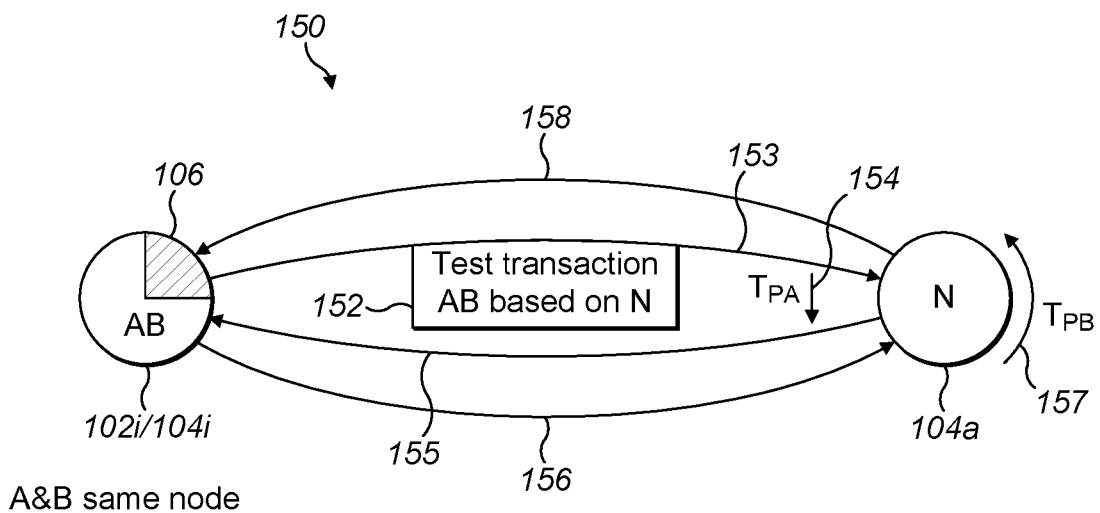
FIG. 1e is a schematic diagram illustrating another example QRF performance test according to the invention.

FIG. 1e is a schematic diagram illustrating another example QRF performance test 150 according to the invention in DLN 100 of FIG. 1a, in which the performance test is based on two or more parties existing or being based on the same user node of the DLN 100. In this example, the QRF performance test 150 is performed by one of nodes 104a-104m, 102a-102n and/or 108a-108p of DLN 100 that includes QRF 106, so-called QRF nodes. In this example, QRF node 102i/104i is used in the performance test of DLN node 104a. The QRF performance test 150 is based on the sending, from QRF node 102i/104i, one or more of test messages to DLN node 104a and the QRF node 102i/104i measuring timestamp information and/or other data available to it the response(s) from DLN node 104a in relation to the one or more test message(s). QRF node 102i/104i send a test message 153 based on diagnostic test transaction 152 acting as both party A and party B, which enables QRF node 102i/104i to measure and/or determine operating performance statistics from the responses of the DLN node 104a processing the diagnostic test transaction 152. The diagnostic test transaction 152 may be between two or more parties (e.g. party A and party B) that requires DLN node 104a to act as a third party node in the transaction.

In this example, the QRF node 102i/104i acts as party A and may select DLN node 104a to act as the trusted third party in the diagnostic test transaction 152 with party B. In operation 154 of the QRF performance test 150, the QRF node 102i/104i sends the diagnostic test transaction 152 towards party B, where QRF node 102i/104i also acts as party B. The QRF node 102i/104i may also record one or more time-stamps for sending/receiving test messages and response(s) thereto when acting as party A. In this case, a diagnostic test transaction start time-stamp may be recorded. Furthermore, the QRF node 102i/104i may also send one or more network reachability test messages in operation 154 to determine end-to-end delay between QRF node 102i/104i and DLN node 104a; or further time-stamps for determining one or more operating performance statistics in relation to the PB(s). In operation 156, the DLN node 104a processes the diagnostic test transaction 152 in relation to party A, which results in a first processing delay in relation to party A (e.g. $T_{PA}$), prior to sending to party B 155.

In operation 158, the DLN node 104a sends the processed diagnostic test transaction 152 in relation to party A towards party B in which QRF node 102j/104j acting as party B receives. The QRF node 102i/104i acting as party B may record one or more further time-stamps for receiving/sending test message(s), response(s) to test message(s) and/or response(s) from DLN node 104a. In this case, the QRF node 102i/104i may record at least a time-stamp for receiving the processed diagnostic test transaction 152 in relation to party A from DLN node 104a. At this point, given QRF node 102i/104i is acting as party A and party B in the diagnostic test transaction 152, from the collected time-stamps from operations 154, 155, 156, 157, and 158 and also from end-to-end delay estimates from network reachability test message(s) between QRF node 102i/104i and DLN node 104a, QRF node 102i/104i may be able to determine the first processing delay in relation to party A (e.g. $T_{PA}$).

The QRF node 102i/104i acting as party B may then "process" the received diagnostic test transaction 152 accordingly and, in operation 160, send party B's response to the diagnostic test transaction 152 to DLN node 104a for further processing at DLN node 104a. In addition, the QRF node 102i/104i may also send one or more further network reachability test messages in operation 160 to determine further end-to-end delay between QRF node 102i/104i and DLN node 104a; and/or further time-stamps for use in determining one or more operating performance statistics in relation to the PB(s). In operation 162, the DLN node 104a processes the diagnostic test transaction 152 response from party B (or in relation to party B), which results in a second processing delay 157 in relation to party B (e.g. TPB), prior to the DLN node 104a sending the processed diagnostic test transaction 152 to QRF node 102i/104i acting as party A. In operation 164, the DLN node 104a sends the processed diagnostic test transaction 152 in relation to parties A and B back to QRF node 102i/104i acting as party A.

The QRF node 102i/104i receives the processed diagnostic test transaction 152 in relation to parties A and B from DLN node 104a and may record an end time-stamp, marking the end of this part of the QRF performance test 150. At this point, given QRF node 102i/104i is acting as party A and party B in the diagnostic test transaction 152, from the collected time-stamps from operations 160-164 and also from end-to-end delay estimates from network reachability test message(s) between QRF node 102i/104i and DLN node 104a, QRF node 102i/104i may be able to determine the second processing delay in relation to party B (e.g. $T_{PB}$). The QRF node 102i/104i may then determine instances and/or samples of operating performance statistics in relation to the PBs based on the time-stamp information and/or end-to-end delay information and the like recorded by QRF node 102i/104i in relation to the diagnostic test transaction 132.

The time-stamp information and/or end-to-end delay information that may be recorded by the QRF node 102i/104i during the diagnostic test transaction 152 may be used to determine, by way of example only but is not limited to, the processing times associated with DLN node 104a processing the diagnostic test transaction 152 in relation to party A and B; the round-trip time for the DLN node 104a processing the diagnostic test transaction 152; end-to-end times between QRF node 102i/104i and DLN node 104a and the like. These may be useful in determining an instance or sample estimate of operating performance data associated with operating performance statistics/parameters in relation to the PBs. The PBs being based on, by way of example only but is not limited to, the availability and/or uptime of the DLN node 104a; transaction processing time of the DLN node 104a; and/or communications bandwidth/speed of the communication link(s) used or available to the DLN node 104a; and/or any other operating performance measure of the DLN node 104a. The instance or a sample estimate of operating performance data of the one or more operating performance statistic(s) may be aggregated with or used to update the corresponding one or more operating performance statistic(s) in relation to each of the PB(s).

As described with reference to FIG. 1d, the QRF performance test 150 may also be performed a plurality of times, thus a plurality of operating performance tests or test message(s) at different time instances are performed by QRF node 102a/104i with DLN node 104a. The plurality of operating performance tests may be performed over a pre-determined time interval, or a number of times to enable the operating performance statistics in relation to the PBs to be statistically relevant/significant. The instance or sample of each of the operating performance statistics/parameters after each performance test may be aggregated to form corresponding the operating performance statistics for each selected node. In an example, the instances or samples determined from the performance tests associated with each operating performance statistic in relation to each PB may be used for calculating the operating performance for the DLN node 104a based on the frequency at which the received operating performance data associated with the selected DLN node 104a satisfy corresponding target operating performance thresholds in relation to the operating PB(s).

The diagnostic transaction test message 152 and/or network reachability messages and responses thereto may allow QRF node 102i/104i to determine an estimate of the availability of the selected DLN node 104a for performing transactions of the selected node based determining an end-to-end delay between QRF node 102i/104i acting as both party A and party B performing the transaction with DLN node 104a. The diagnostic transaction test message 152 and/or network reachability messages and responses thereto may allow the QRF node 102i/104i to determine an estimate of the total transaction processing time (e.g. $T_{PA}$+ $T_{PB}$) of the selected DLN node 104a, and/or the transaction processing time associated with each party (e.g. $T_{PA}$ and $T_{PB}$) in relation to a diagnostic test transaction 152 (and/or network reachability messages) based on round-trip time of the diagnostic test transaction 152 being performed between the nodes of the two or more parties of the diagnostic test transaction 152 (e.g. between QRF node 102i/104i as party A; and/or QRF node 102i/104i as party B) and the selected DLN node 104a and the end-to-end delay between the nodes of the two or more parties and the selected DLN node 104a. Furthermore, the one or more test messages and responses thereto may be used to determine an estimate of the communication bandwidth of the communication link or connection the selected DLN node 104a has with the DLN 100 based on determining round-trip-time and/or end-to-end delay between the two or more parties in a transaction 152 with the selected DLN node 104a and/or network reachability test message(s).

Figure 1F:
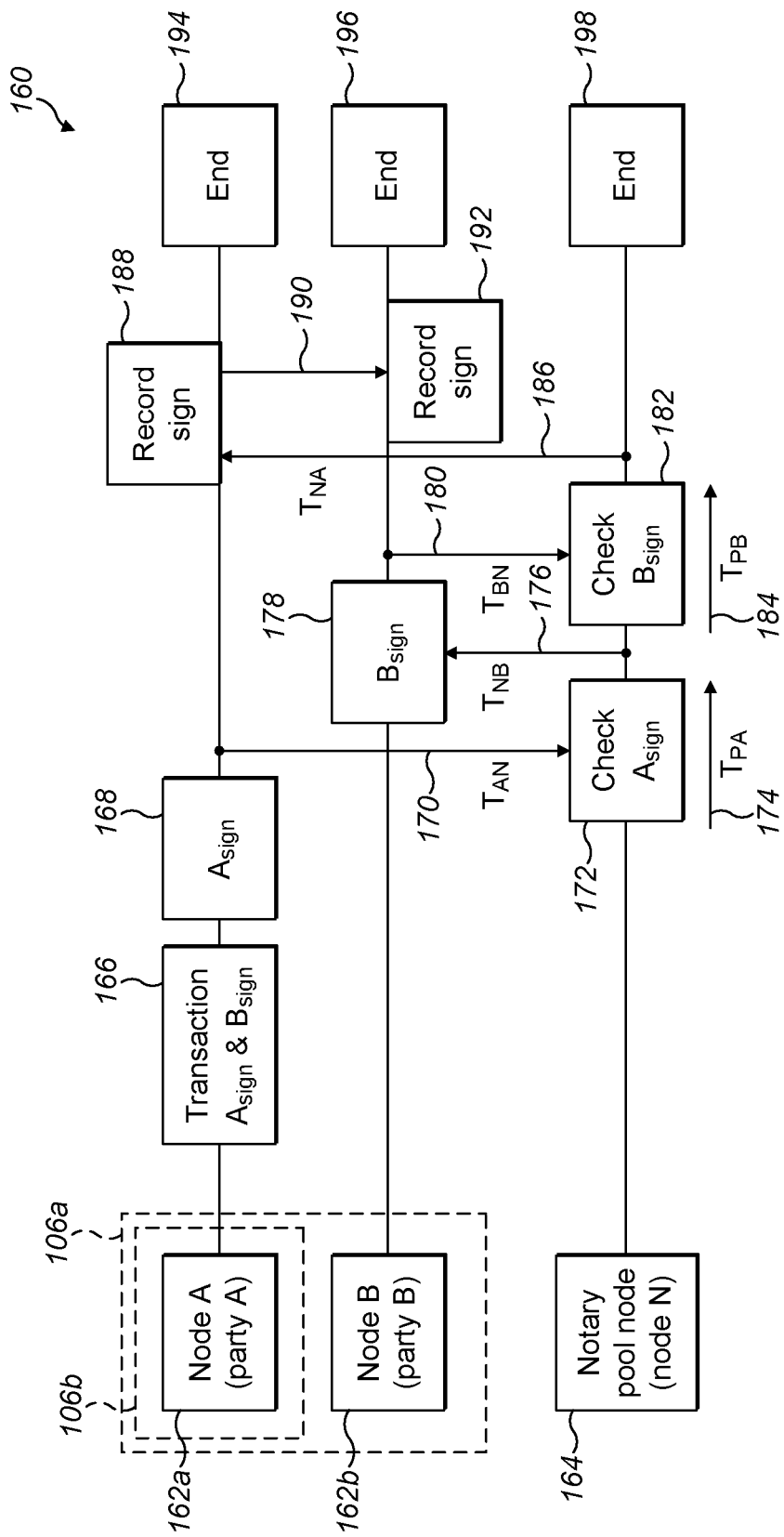
FIG. 1f is a flow diagram illustrating an example QRF workflow of a performance test for determining performance statistics in relation to one or more performance benchmarks according to the invention.

FIG. 1f is a flow diagram illustrating an example QRF workflow 160 between one or more QRF node(s) 162a and/or 162b and a selected DLN node 164 (e.g. a notary node from a notary pool) in relation to a performance test based on a diagnostic test transaction 166. The diagnostic test transaction 166 may be a transaction between party A and a party B in which each party is required to sign portions of the transaction 166. The transaction may be part of a smart contract that requires the signature of party A and party B. The diagnostic test transaction may be used to determine sample performance statistics/parameters that may be aggregated to determine performance statistics of notary node 164 in relation to one or more PBs such as, by way of example only but not limited to, notary node 164 availability or uptime, transaction processing speed/delay of notary node 164, and/or communication bandwidth/speed of notary node 164 and the like. The QRF node(s) 162a and 162b include a QRF 106a and 106b for performing performance tests and aggregating operating performance statistics corresponding to PB(s) in relation to notary node 164. QRF node 162a acts as party A in the diagnostic test transaction 166 and QRF node 162b acts as party B in the diagnostic test transaction 166. QRF node 162a acting as party A and QRF node 162b acting as party B may be part of the same QRF node and/or may be part of different QRF nodes as described, for example, with reference to FIGS. 1d and 1e.

In this case, QRF node 162a acting as party A initiates the diagnostic test transaction 166 and, in workflow operation 168, adds the signature of party A to the diagnostic test transaction (or signs the diagnostic test transaction on behalf of party A), which requires processing by notary node 164 to check and/or authenticate that party A validly signed the transaction. In workflow operation 170, the signed diagnostic test transaction with party A signature is sent/transmitted to the notary node 164, which may take a communication link transmission time interval of $T_{AN}$ to transfer the signed diagnostic test transaction from QRF node 162a to notary node 164. In workflow operation 172, the notary node 164 processes the received diagnostic test transaction by checking, validating, and/or authenticating the signature of party A added to the diagnostic test transaction 166. This may require notary node 164 to get consensus from a pool of notary nodes that party A has signed the transaction, and once consensus is obtained, add or record this portion of the transaction to a distributed ledger. This results in a first processing delay 174 (e.g. $T_{PA}$) for processing party A's signature.

In workflow operation 176, notary node 164 may then send the validated diagnostic test transaction signed by party A to QRF node 162b acting as party B, which may take a communication link transmission time interval of $T_{NB}$ to transfer the validated diagnostic test transaction signed by party A from notary node 164 to QRF node 162b. In workflow operation 178, QRF node 162b acting as party B adds the signature of party B to the validated diagnostic test transaction signed by party A (or signs the validated diagnostic test transaction on behalf of party B). Again, this requires processing by notary node 164 to check and/or authenticate that party B validly signed the transaction. In workflow operation 180, the signed diagnostic test transaction with party's A signature and party's B signature is sent/transmitted to the notary node 164, which may take a communication link transmission time interval of $T_{BN}$ to transfer the diagnostic test transaction signed by party A and party B from QRF node 162b to notary node 164.

In workflow operation 182, the notary node 164 processes the received diagnostic test transaction signed by party A and party B by checking, validating, and/or authenticating the signature of party B added to the diagnostic test transaction in workflow operation 178. This may require notary node 164 to get consensus from a pool of notary nodes that party B has validly signed the transaction, and once consensus is obtained, add or record this portion of the transaction to a distributed ledger. This results in a second processing delay 184 (e.g. $T_{PB}$) for processing party B's signature. In workflow operation 186, notary node 164 may then send the validated diagnostic test transaction signed by party A and party B to QRF node 162a acting as party A, which may take a communication link transmission time interval of $T_{NA}$ to transfer the validated diagnostic test transaction signed by party A and party B from notary node 164 to QRF node 162a. In workflow operation 188, QRF node 162a may record (e.g. record it in a distributed ledger) the signature(s) of the validated diagnostic test transaction signed by party A and party B and end its part of the transaction in operation 194. In workflow operation 190, QRF node 162a may send the validated diagnostic test transaction signed by party A and party B to QRF node 162b acting as party B, which in workflow operation 192 may record the signature(s) of the validated diagnostic test transaction signed by party A and party B and end its part of the transaction in operation 196. After sending the validated diagnostic test transaction signed by party A and party B from notary node 164 to QRF node 162a, the notary node 164 may end, in workflow operation 198, its part of the transaction.

For example, the total processing time that notary node 164 takes to process the transaction in relation to party A and party B may be defined as $T_P = T_{PA} + T_{PB}$, which may be derived based on, by way of example only but is not limited to: a) the total round-trip time (e.g. $T_{RTT(TOT)}$) taken from QRF node 162a transmitting the diagnostic test transaction signed by party A in workflow operation 170 and receiving the validated diagnostic test transaction signed by party A and party B in workflow operation 186; b) the round-trip time $T_{RTT(AN)}$ based on transmission times $T_{AN}$ and $T_{NA}$ of workflow operations 170 and 186 between QRF node 162a acting as party A and notary node 164; and c) $T_{RTT(BN)}$ based on transmission times $T_{NB}$ and $T_{BN}$ of workflow operations 176 and 180 between QRF node 162b acting as party B and notary node 164. These may be determined by transmission/reception time stamps recorded at QRF nodes 162a and 162b during workflow operations 170, 176, 180, 186 and/or further network reachability test message(s) determining end-to-end delay between QRF node 162a and notary node 164 and/or QRF node 162b and notary node 164. For example, the total processing time 161 may be defined as $T_P = T_{RTT(TOT)} - (T_{RTT(AN)} + T_{RTT(BN)})$ when QRF node 162a acting as party A and QRF nodes 162b acting as party B are different QRF nodes. In another example, the total processing time 163 may be defined as $T_P = T_{RTT(TOT)} - 2(T_{RTT(AN)}) = T_{RTT(TOT)} - 2(T_{RTT(BN)})$ when QRF node 162a acting as party A and QRF node 162b acting as party B are the same QRF node, and hence the round-trip time $T_{RTT(AN)}$ is substantially the same as round-trip time $T_{RTT(BN)}$.

Figure 2A:
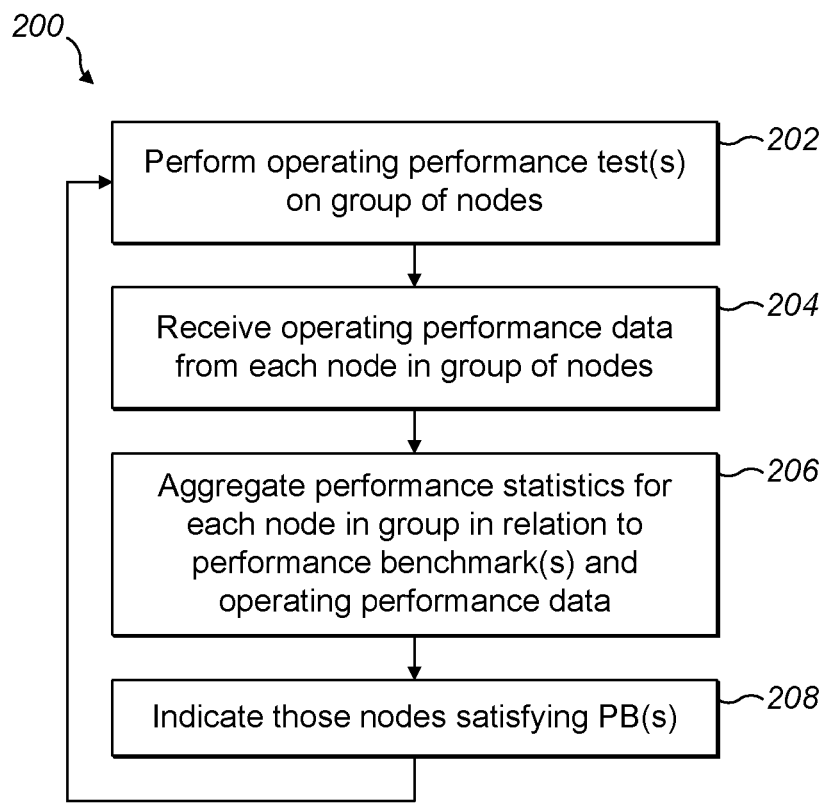
FIG. 2a is a flow diagram illustrating an example QRF process according to the invention.

FIG. 2a is a flow diagram illustrating an example QRF process 200 according to the invention. The QRF process 200 may be implemented and/or performed in any one of the nodes 102, 104 and 108 of DLN's 100, 120 and/or 130 as described with reference to FIGS. 1a-1f. The QRF process 200 may be part of a centralised, decentralised and/or hybrid centralised/decentralised QRF system as described with reference to FIGS. 1b and/or 1c. The QRF process 200 may be used for regulating the operation of a DLN 100, 120 and/or 130, where the DLN 100, 120 and/or 130 includes a plurality of nodes 102a-102n, 104a-104m, 108a-108p in which the plurality of nodes includes a group of nodes 104. Each node in the group of nodes 104 includes functionality for acting as a trusted third party node on a distributed ledger transaction. One or more of the plurality of nodes 102a-102n, 104a-104m, and/or 108a-108p may include functionality based on the QRF process 200 for assisting in providing an indication to DLN 100, 120 and/or 130 as to whether nodes in the group of nodes 104 satisfy operating performance benchmarks required for acting as trusted third party nodes in distributed ledger transactions.

The QRF process 200 may be performed based on the following block(s) or operation(s) of: In block 202, the QRF 200 performs an operating performance test on one or more selected nodes 104a-104m of the group of nodes 104. The operating performance test includes sending a plurality of test messages to each selected node 104a-104m over a predetermined time period. In block 204, the QRF 200 receives operating performance data associated with each selected node 104a-104m in relation to the operating performance test. In block 206, the QRF 200 aggregates operating performance statistics for each selected node 104a-104m based on the received operating performance responses. In block 208, the QRF indicates to the DLN 100 those selected nodes 104a-104m satisfying one or more operating PB(s) for acting as a trusted third party for distributed ledger transactions over the DLN 100 based on the aggregated operating performance statistics.

The blocks of the QRF process 200 may be performed such that each selected node of the group of nodes 104a-104m receives a plurality of operating performance tests over a predetermined time interval in which the operating performance statistics for each selected node are aggregated over this predetermined time interval. Aggregating the operating performance statistics for each selected node may further include calculating the operating performance statistics for each selected node based on the frequency at which the received operating performance data associated with the selected node satisfy corresponding target operating performance thresholds in relation to the operating PB(s). This has been described with reference to FIGS. 1a-1f.

Given the plurality of performance test(s) may be performed over a predetermined time interval, each of the operating performance tests may be sent and/or received by the selected node at random or pseudo-random time instances over the predetermined time interval. This is to ensure that the selected node does not or cannot readily suspect or identify that it is being tested by the QRF process 200. This maximises the chances that the node performs as it would for any normal distributed ledger transaction for one or more parties.

Block 206 may be further modified to include determining a selected node satisfies the operating PB(s) when the operating performance statistics indicate the selected node meets or exceeds a quality metric for each of the operating PB(s). For example, the quality metric may be based, by way of example only but is not limited to, on a frequency or number of times the selected node satisfies the corresponding operating PB in relation to the number of test messages received. Additionally or alternatively, the quality metric may be based, by way of example only but is not limited to, on a percentage of a time interval, or number of test messages received/sent, that the selected node satisfies a performance benchmark expressed in terms of M 9's or MN5, where M>=1. Additionally or alternatively, the quality metric is based, by way of example only but is not limited to, on a probability over a time interval, or number of test messages received/sent, that the selected node satisfies a PB.

Block 206 may be further modified to include indicating to the distributed ledger network those selected nodes satisfying one or more operating PB(s) to further include: storing, in a blockchain or distributed ledger, the operating performance statistics for each of the selected nodes and/or whether each of the selected nodes satisfies the one or more operating performance benchmark(s); and providing access to the blockchain or distributed ledger to one or more parties of a transaction in which a node may be selected for acting as a trusted third party for the transaction. The blockchain or distributed ledger may be accessible by one or more parties of a distributed ledger transaction, or accessible by the user nodes of the one or more parties of the distributed ledger transaction, for use in selecting a node 104a that satisfies the operating performance benchmark(s) required for acting as a third party node in the distributed ledger transaction.

For example, in a DLN based on CORDA® that implements the QRF process 200, the QRF process 200 may be configured to, by way of example only but is not limited to, operate based on the following PB(s): a) a selected node 104a from the group of nodes 104 must be available to authorise transactions (e.g. network reachability/availability/uptime); b) a selected node 104a from the group of nodes 104 must perform to a maximum latency of X milliseconds (e.g. has a minimum communication bandwidth/speed), where X is a predetermined communication latency threshold (e.g. 450 milliseconds); c) a selected node 104a from the group of nodes 104 must process a dummy transaction or diagnostic test transaction in no less than Y seconds (e.g. transaction processing time), where Y is a predetermined processing time threshold.

In item a) the QRF process 200 may as part of the performance test, by way of example only but is not limited to, send test messages (e.g. ping or keep-alive) to determine whether the selected node 104a is switched on, functioning as normal and available to accept any request or transaction from the DLN. If a node operator associated with selected node 104a has configured the selected node 104a as a shared computing infrastructure for other tasks unrelated to those required of the DLN (e.g. distributed ledger transactions) tasks, then such sharing of computing resources will mean the selected node 104a breaches this item a) PB and hence may breach the required performance service level that the selected node 104a is expected to meet or satisfy for it to act as a trusted third party node in a transaction.

In item b) the QRF process 200 may as part of the performance test, by way of example only but is not limited to, send test messages (e.g. ping, keep-alive, network reachability messages, speed test messages and the like) to determine whether the communication link (or telecommunication or Internet connection) is capable of receiving and confirming, by way of example only but is not limited to, a single bit message (not including transaction processing data or time) in less than X milliseconds round trip to the node operating the QRF process 200 (e.g. a requesting network node). If a node operator associated with selected node 104a is using, by way of example only but is not limited to, a low quality broadband connection, then very possible that the selected node 104a breaches this item b) PB and hence may breach the required performance service level that the selected node 104a is expected to meet or satisfy for it to act as a trusted third party node in a transaction. Furthermore, this would slow down the DLN 100 and a create perception amongst the parties and/or user nodes that the DLN 100 is unreliable and/or losing transactions. Thus a loss of trust may result in one or more parties using the DLN 100.

In item c) the QRF process 200 may as part of the performance test, by way of example only but is not limited to, send diagnostic test transaction messages and/or dummy test transaction messages between fictitious parties (e.g. party A and B) towards the selected node 104a and determine the processing time that the selected node 104a takes to process the test transaction message to ensure the selected node 104a has adequate processing power to process and confirm a transaction in no longer than the processing time threshold (e.g. a specified maximum processing time elapsed), which may be measured based on round-trip-time for the requesting node that operates the QRF process 200 and the selected node 104a in relation to the transaction and/or end-to-end times established via alternative methods (e.g. ping and the like). If a node operator associated with selected node 104a has configured the selected node 104a as a shared computing infrastructure for other tasks unrelated to those required of the DLN (e.g. distributed ledger transactions) tasks, then such sharing of computing resources will mean the selected node 104a also breaches this PB and hence may breach the required performance service level that the selected node 104a is expected to meet or satisfy for it to act as a trusted third party node in a transaction. Alternatively, it may be that the selected node 104a has a malfunction and is performing poorly, thus it cannot process the transactions to meet the item c) PB.

The QRF process 200 may automatically test these PBs on, by way of example only but is not limited to, a daily basis for at least all the nodes 104a-104m in the group of nodes 104. The PB result(s) information may be aggregated as operating performance statistics and kept updated via a distributed ledger or blockchain on the DLN, which provides an indisputable immutable record of the performance of each of the nodes 104a-104m in the group of nodes 104. Furthermore, the QRF process 200 may be configured to ensure that each node operator, which may be associated with a different subgroup of nodes from the group of nodes 104, should maintain and ensure each node in their subgroup of nodes satisfies the PB(s), by way of example only but not limited to, a certain percentage of the time or better; each node meets or exceeds a quality metric associated with the PB(s); a quality metric based on a frequency or number of times each node satisfies the corresponding operating PB in relation to the number of test messages received; a quality metric based on a percentage of a time interval, or number of test messages received/sent, each node satisfies a performance benchmark expressed in terms of M 9's performance (e.g. triple 9, 999 performance) or M Nines 5 (MN5) performance (e.g. one and a half nines, M=1, represents a percentage 95 level of performance, two and a half nines, M=2, represents a percentage 99.5 level of performance, or four and a half nines, M=4, represents a percentage 99.995 level of performance, and the like); a quality metric based on a probability over a time interval, or number of test messages received/sent, that each node satisfies the PB(s); or any other performance measure or quality metric useful for assessing whether a node meets or satisfies the PB(s).

The QRF process 200 may further notify, penalise or reward a node operator or node during a period of time (e.g. a period of 30 Trailing days) in which each node associated with the node operator breaches the PB(s) and hence the service level required for those nodes to act as trusted third parties in a transaction. In response, the QRF process 200 and/or the DLN may be configured to automatically re-route transactions (e.g. transaction authorisation requests) away from the nodes of the node operator that breach the PB(s) and towards nodes that satisfy the PB(s). The QRF process 200 may provide a maintenance or extension time period or interval (e.g. a cure period of 10 days) that allows the node operator of each node that breaches the PB(s) to improve the performance of these nodes and meet the required PB(s) and/or performance service levels. Failing this, the QRF process 200 and/or DLN 100 may being re-routing transaction traffic away from those nodes that breach the PB(s) etc.

The QRF process 200 may further notify or send an automatic alert or diagnostic message to a node, node operator, or the node operators contact point, in relation to each node or the nodes that breach the PB(s) and hence the required performance service levels. This may also include a notification that transactions are to be, or are being, rerouted away from the nodes associated with the node operator that breach the PB(s). Should the PB breach be cured, then the QRF process 200 and/or DLN will automatically restore routing of transaction traffic to those nodes that meet the PB(s) and hence the required performance service levels.

Figure 2B:
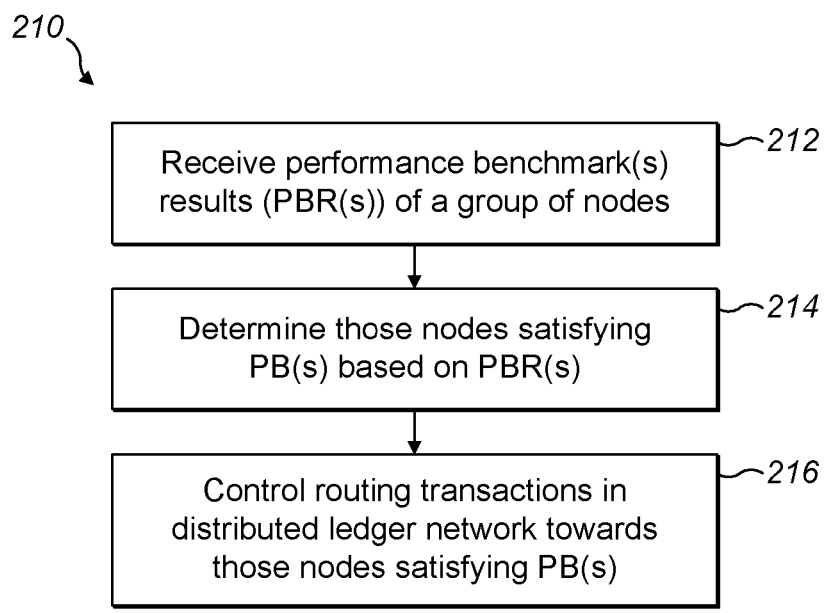
FIG. 2b is a flow diagram illustrating another example QRF process according to the invention.

FIG. 2b is a flow diagram illustrating an example QRF indication process 210 according to the invention. The QRF process 200 of FIG. 2a may be performed in which block 206, which indicates to the DLN 100 those selected nodes 104a-104m satisfying one or more operating PB(s) for acting as a trusted third party for distributed ledger transactions based on the aggregated operating performance statistics, may be further modified based on performance benchmark result(s) of each of the selected nodes 104a-104m. The QRF indication process 210 includes the blocks or operations based on the following: In block 212, the QRF process 210 receives performance benchmark result(s) of a group of nodes 104a-104m, which may include an indication of whether the selected nodes 104a-104m as described with reference to FIG. 2a satisfy the PB(s) based on the aggregated operating performance statistics. In block 214, the PB result(s) may be assessed to determine which nodes do satisfy the PB(s) based on the PR result(s) and which nodes do not satisfy the PB(s) based on the PB result(s). The PB results for each selected node 104a-104m may simply be an indication or binary flag indicating those nodes that satisfy the PB(s) and those node(s) that do not satisfy the PB(s). For example, the indication for a node may comprise data representative of, by way of example only but is not limited to, a) 'True' that the node satisfies the PB(s) or 'False' that the node does not satisfy the PB(s); or b) '1' for satisfying the PB(s), and '0' for not satisfying the PB(s); or any value for satisfying the PB(s) and another different value for not satisfying the PB(s) and the like. and performance benchmark result(s) of a group of nodes 104a-104m. In block 216, the QRF process 210 may control and/or influence the routing of transaction traffic or transactions in the DLN 100 towards those selected nodes 104a-104m that satisfy the PB(s). Each of those selected nodes 104a-104m that do not satisfy the PB(s) may see dwindling traffic and/or eventually not receive any transaction traffic until said each selected node's PB result(s) indicate they satisfy the PB(s) once more. It is noted that the selected nodes 104a-104m, whether they satisfy the PB(s) or not, will be continually tested over further predetermined time intervals or periods, in which QRF process 200 may be performed at any time during those intervals of periods etc.

Block 216 may be further modified where indicating to the DLN 100 those selected nodes satisfying one or more operating performance benchmark(s) further includes ensuring transactions are routed to those selected nodes satisfying one or more operating performance benchmark(s). This may be achieved by configuring the DLN 100 to route transactions to only those nodes that satisfy the PB(s) for acting as trusted third parties to the transaction. Ensuring transactions are routed to nodes satisfying the PB(s) further includes configuring the DLN to re-route transactions away from those selected nodes indicated as not satisfying one or more of the operating PB(s). This ensures a minimum standard or service may be provided to all user nodes 102a-102n of the DLN 100, 120 and/or 130 and also minimises or avoids delay(s) during a transaction (e.g. consensus delays) and/or minimised or avoids failure of time sensitive portions of distributed ledger transactions.

Figure 2C:
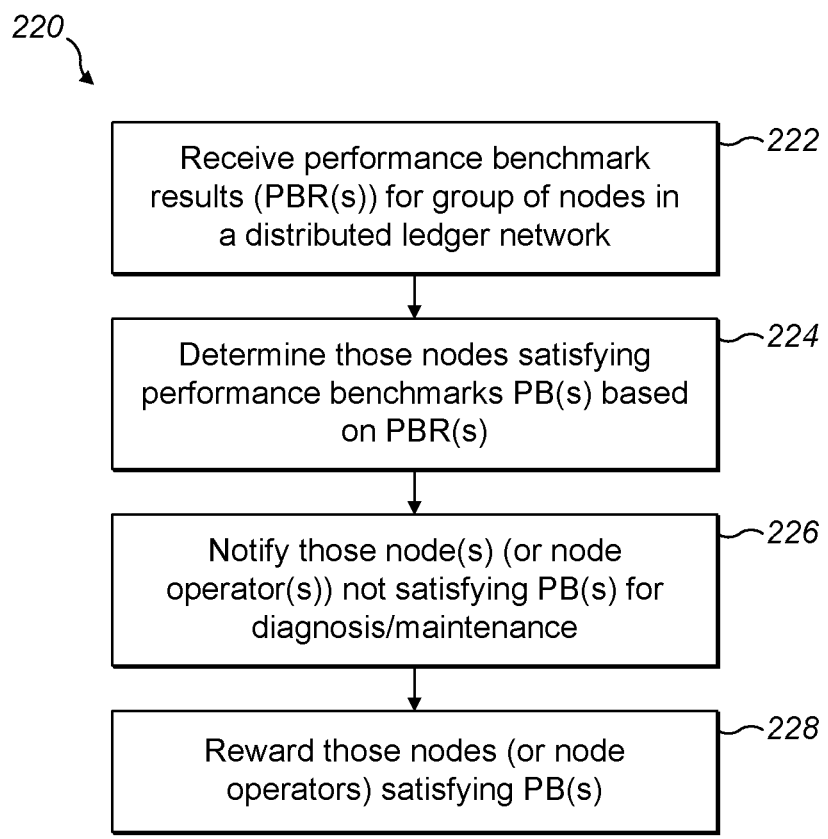
FIG. 2c is a flow diagram illustrating a further example QRF process according to the invention.

FIG. 2c is a flow diagram illustrating a further example QRF indication process 220 according to the invention. The QRF process 200 of FIG. 2a may be performed in which block 206, which indicates to the DLN 100 those selected nodes 104a-104m satisfying one or more operating PB(s) for acting as a trusted third party for distributed ledger transactions based on the aggregated operating performance statistics, may be further modified based on performance benchmark result(s) of each of the selected nodes 104a-104m. The QRF indication process 220 further includes the blocks or operations based on the following: In block 222, the QRF process 210 receives performance benchmark result(s) of a group of nodes 104a-104m in the DLN 100, which may include an indication of whether the selected nodes 104a-104m as described with reference to FIGS. 2a and/or 2b satisfy the PB(s) based on the aggregated operating performance statistics. In block 224, the PB result(s) may be assessed to determine which nodes do satisfy the PB(s) based on the PR result(s) and which nodes do not satisfy the PB(s) based on the PB result(s) in a similar manner as block 214 of FIG. 2b. In block 226, the QRF process 220 may notify those nodes 104a-104m (or node operators of each node) that do not satisfy all of the PB(s) to enable those nodes 104a-104m and/or node operators to perform diagnosis or maintenance on the nodes that do not satisfy or fail the PB(s). These nodes may be tested again in another predetermined test time interval, and thus, based on any maintenance or diagnosis carried out by the node and/or node operator, may satisfy the PB(s) at that time. In block 228, those nodes and/or the node operators of the selected nodes 104a-104m that satisfy the PB(s) may be rewarded for satisfying the PB(s). The reward may be a set number of tokens or distributed ledger tokens awarded to the node and/or node operator, which may allow the node to use services of other nodes in the DLN 100 and the like.

When the group of nodes 104a-104m includes a plurality of subgroups of nodes and each subgroup of nodes is associated with a corresponding node operator, then block 226 may be further modified to include the QRF indication process 220 sending a notification to each node operator as to whether those selected nodes of the subgroup of nodes associated with the node operator satisfy the operating performance benchmark(s). Depending on their function, each of the nodes in the subgroup of nodes may operate independently of other nodes in the subgroup of nodes and/or operate independently of other nodes in other subgroups of nodes of other operators. For example, one or more nodes in the subgroup of nodes may be used to form, by way of example only but is not limited to, a notary or jury function, a notary/jury or any other function as the application demands in which each of the nodes in the subgroup of nodes are required to operate independently of other nodes in the subgroup of nodes and/or operate independently of other nodes in other subgroups of nodes that are also used to form the notary or jury function or other function as the application demands. The notification may also include notifying the node operator of those selected nodes in the subgroup of nodes that do not satisfy all of the operating performance benchmark(s). Alternatively or additionally, the notification may further include diagnostic data representative of the operating performance statistics of the selected nodes in the subgroup of nodes. The diagnostic data may indicate whether a selected node satisfies the operating performance test/PB(s) or not. This diagnostic data may assist the node operator to run a diagnosis on those nodes not satisfying the PB(s) and/or improve the performance of these nodes to enable these nodes to satisfy the PB(s) the next time the operating performance test(s) are performed.

When the group of nodes 104a-104m includes a plurality of subgroups of nodes and each subgroup of nodes is associated with a corresponding node operator, then block 228 may be further modified to include rewarding each node operator based on those node satisfying the PB(s), which may be achieved by providing a number of tokens or distributed ledger tokens to the node operator based on the number of selected nodes in the subgroup of nodes that satisfy all of the operating performance benchmark(s). Depending on their function, each of the nodes in the subgroup of nodes may be configured to operate independently of other nodes in the subgroup of nodes and/or independently of other nodes in other subgroups of nodes of other operators. This may incentivise node operators to maintain the nodes and ensure a sufficient number of nodes in the group of nodes 104a-104m satisfy the PBs for acting as a trusted third party in distributed ledger transactions.

Although FIGS. 2b and 2c are described separately, it is to be appreciated by the skilled person that a QRF indication process 210 and/or 220 may include at least one or more of blocks 216, 226, and 228 or any other penalty for not satisfying the PB(s) and/or incentive for satisfying the PB(s). For example, QRF indication process 210/220 may be modified to route transaction traffic towards nodes that satisfy the PB(s), whilst at the same time notifying those nodes that do not satisfy the PB(s) that they do not satisfy the PB(s) and should be maintained/diagnosed to improve their performance for the next test period/interval. In another example, QRF indication process 210/220 may be modified to route transaction traffic towards nodes that satisfy the PB(s) and routing transaction traffic away from nodes not satisfying the PB(s), whilst at the same time notifying those nodes that do not satisfy the PB(s) that they do not satisfy the PB(s) and should be maintained/diagnosed to improve their performance for the next test period/interval, and also rewarding those nodes or node operators that satisfy the PB(s).

Figure 3:
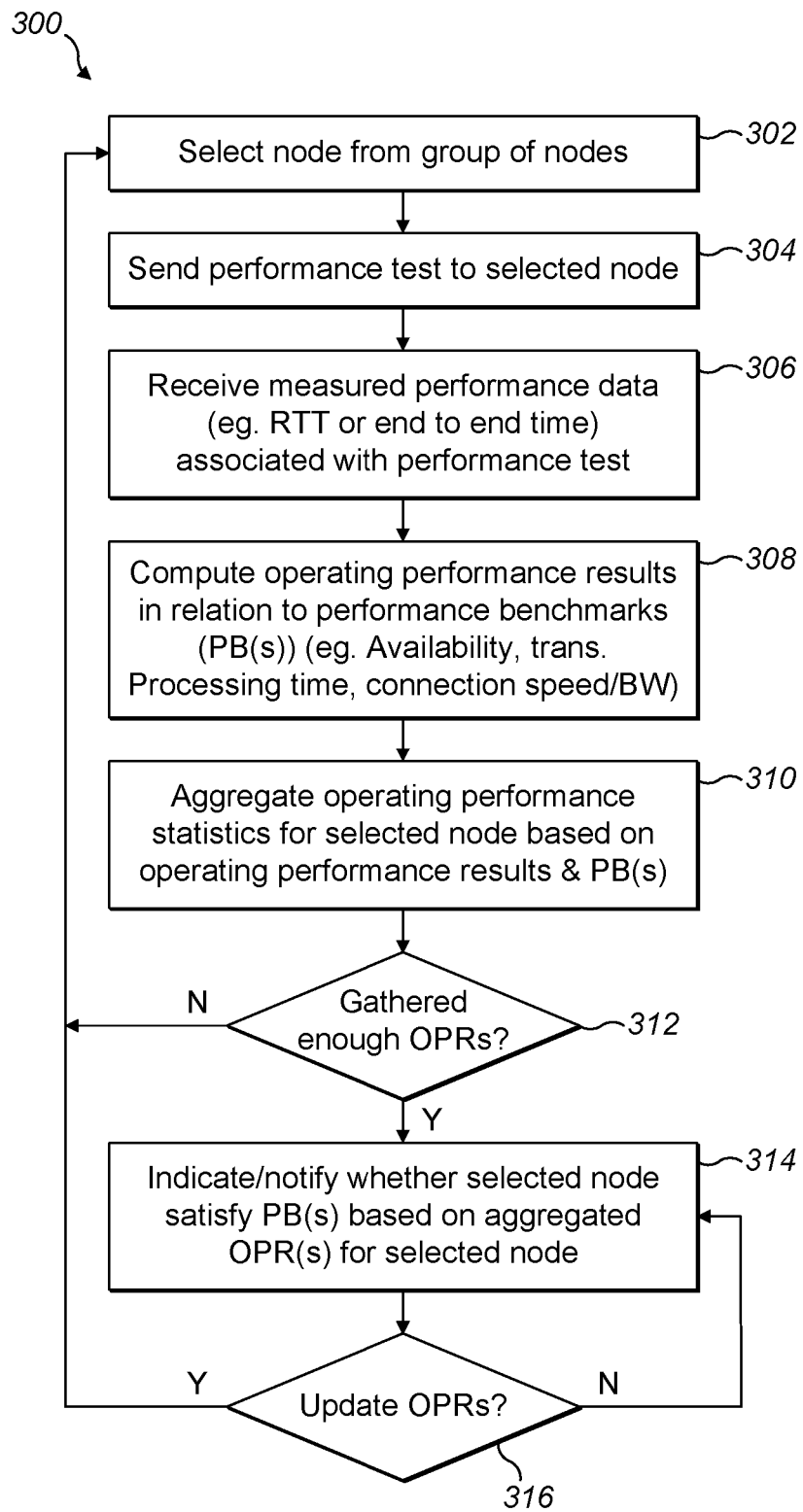
FIG. 3 is a flow diagram illustrating an example QRF process according to the invention.

FIG. 3 is a flow diagram illustrating yet another example QRF process 300 according to the invention. The QRF process 300 may be implemented and/or performed in any one of the nodes 102, 104 and 108 of DLN's 100, 120 and/or 130 as described with reference to FIGS. 1a-1f. The QRF process 300 may be part of a centralised, decentralised and/or hybrid centralised/decentralised QRF system as described with reference to FIGS. 1b and/or 1c. The QRF process 300 may be used for regulating the operation of a DLN 100, 120 and/or 130, where the DLN 100, 120 and/or 130 includes a plurality of nodes 102a-102n, 104a-104m, 108a-108p in which the plurality of nodes includes a group of nodes 104. Each node in the group of nodes 104 includes functionality for acting as a trusted third party node on a distributed ledger transaction. One or more of the plurality of nodes 102a-102n, 104a-104m, and/or 108a-108p may include functionality based on the QRF process 300 for assisting and/or regulating those nodes indicated to DLN 100, 120 and/or 130 in the group of nodes 104 that satisfy and/or do not satisfy operating performance benchmarks required for acting as trusted third party nodes in distributed ledger transactions.

The QRF process 300 may be performed based on the following block(s) or operation(s) of: In block 302, the QRF 300 selects a node 104a from the group of nodes 104 for performing an operating performance test on said selected node 104a. It may be that this selected node 104a has not been tested before, or that it is due to be tested. In block 304, the QRF process 300 performs the operating performance test on the selected node 104a, which includes the performance test to the selected node 104a. The performance test may include sending a plurality of test messages to the selected node 104a over a predetermined time period. The test messages may include, by way of example only but is not limited to, dummy distributed ledger transactions (or diagnostic test distributed ledger transactions) for one or more parties, network reachability messages, any other messages that may allow the QRF process 300 to measure or extrapolate a performance parameter or data associated with node 104a. In block 306, the QRF process 300 receives measured performance parameters and/or data in relation to the performance test such as, by way of example only but not limited to, time stamps of transmitting test message(s)/receiving response(s), round-trip-times, end-to-end delay times between QRF process 300 and node 104a; and/or any other data useful for determining one or more performance parameters/data associated with node 104a. In block 308, the QRF process computes operating performance results and/or data in relation to one or more PB(s) (e.g. availability of node 104a, average transaction processing time of node 104a, connection speed or bandwidth available to node 104a, and the like). In block 310, the QRF process 300 aggregates operating performance samples into operating performance statistics for the selected node 104a based on the operating performance results/data and the PB(s). Each operating performance sample being based on the recently received operating performance results/data for a test message/performance test. In block 312, it is determined whether enough operating performance samples have been aggregated to form the operating performance statistics over the predetermined time interval. If further operating performance samples are required (e.g. not enough OPRs have been gathered 'N'), then the QRF process 300 proceeds to block 304 in which a further performance test is sent to the selected node 104a. Alternatively or additionally, the QRF process 200 may return to block 302 for selecting another node from the group of nodes 104a-104m, which may result in node 104a being selected. If further operating performance samples are not required (e.g. enough OPRs have been gathered 'Y'), the process 300 proceeds to block 314. In block 314, the QRF process 300 indicates/notifies whether the selected node 104a satisfies the PB(s) based on the operating performance statistics (e.g. aggregated OPR(s)) for the selected node 104a. This may include indicating to the DLN 100 whether the selected node 104a satisfies all of the one or more operating PB(s) for acting as a trusted third party for distributed ledger transactions over the DLN 100 based on the aggregated operating performance statistics of the selected node 104a. This may result in various additional blocks/operations being performed as described with reference to FIGS. 2a-2c. The QRF process 104a proceeds to block or operation 316 in which the QRF process checks whether the operating performance statistics and/or operating performance results should be updated or not. This may be because the predetermined time period has expired, and a new predetermined time period for updating the operating performance statistics has started. Alternatively or additionally, the QRF process 104a may detect that node 104a is due for an operating performance statistic/result update. If an updated is required (e.g. Y), then the QRF process 300 proceeds to blocks 302 and/or 304 for updating the operating performance results/statistics in relation to node 104a. If an update is not required (e.g. 'N') then the QRF process 300 proceeds to block 314, where it maintains its indication as to whether node 104a satisfies the PB(s) required for acting as a trusted third party in a distributed ledger transaction.

Figure 4:
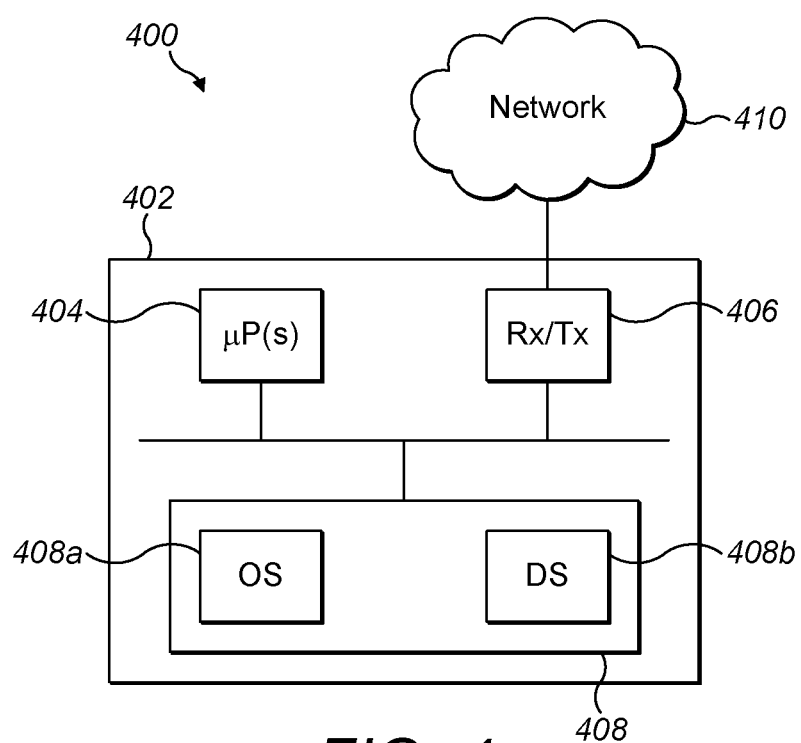
FIG. 4 is a schematic diagram of an example computing system and device according to the invention.

FIG. 4 is a schematic diagram illustrating a computing system 400 that may be used to implement one or more aspects of the QRF system, QRF process(es) and the like according to the invention and/or includes the functionality of the method(s), process(es), apparatus and/or system(s) associated with the invention, modifications thereof, combinations thereof, or as described herein, and/or as described with reference to any of FIGS. 1a to 3. Computing system includes a computing device 402, the computing device including one or more processor unit(s) 404, communication interface 406, and memory unit 408 in which the one or more processor unit(s) 404 are connected to the memory unit 408 and the communication interface 406. The communications interface 406 may connect the computing device 402 with one or more databases or other processing system(s) or computing device(s) over one or more networks 410 (e.g. a distributed ledger network). The memory unit 408 may store one or more program instructions, code or components such as, by way of example only but not limited to, an operating system 408a for operating computing device 402 and a data store 408b for storing additional data and/or further program instructions, program code and/or components associated with implementing the functionality and/or one or more function(s) or functionality associated with one or more of the method(s) and/or process(es) of the apparatus, module(s), nodes, QRF nodes, mechanisms and/or system(s)/platforms/architectures; modifications thereof; combinations thereof; as described herein and/or as described with reference to at least one of FIGS. 1a to 3.

Further aspects of the invention may include one or more apparatus and/or devices that include a communications interface, a memory unit, and a processor unit, the processor unit connected to the communications interface and the memory unit, wherein the processor unit, storage unit, communications interface are configured to perform the system(s), apparatus, QRF nodes, QRF process(es), method(s) and/or process(es); modifications thereof; combinations thereof; as described herein; and/or as described with reference to FIGS. 1a to 3.

Further additional aspects of the invention may include a node in a distributed ledger network, the distributed ledger network including a plurality of nodes, the plurality of nodes including a group of nodes, where each node in the group of nodes includes functionality for acting as a third party node in a transaction, the node configured perform or implement the system(s), apparatus, QRF nodes, QRF process(es), method(s) and/or process(es) according to the invention; modifications thereof; combinations thereof; as described herein; and/or as described with reference to FIGS. 1a to 3.

Further aspects of the invention may include a distributed ledger network comprising a plurality of nodes, the plurality of nodes comprising a group of nodes, wherein each node in the group of nodes includes functionality for acting as a third party node in a transaction, where one or more nodes of the plurality of nodes further comprises functionality configured to perform or implement the system(s), apparatus, QRF nodes, QRF process(es), method(s) and/or process(es) according to the invention; modifications thereof; combinations thereof; as described herein; and/or as described with reference to FIGS. 1a to 3.

The distributed ledger network as described herein with reference to FIGS. 1a to 5 may be based on at least one of:

a) a CORDA based distributed ledger network and the group of nodes comprises a pool of notary nodes; b) blockchain based distributed ledger network and the group of nodes comprises a pool of miner nodes; and c) any other type of distributed ledger network in which a group of nodes comprises nodes for acting as trusted third parties in a distributed ledger transaction for one or more parties.

The group of nodes as described herein with reference to FIGS. 1a to 5 may be based on at least one type of node from the group of: super-peer node; master node; miner node; jury node; notary node; and/or any other node that may include functionality for acting as a trusted third party node in relation to distributed ledger transactions according to the invention.

Figure 5:
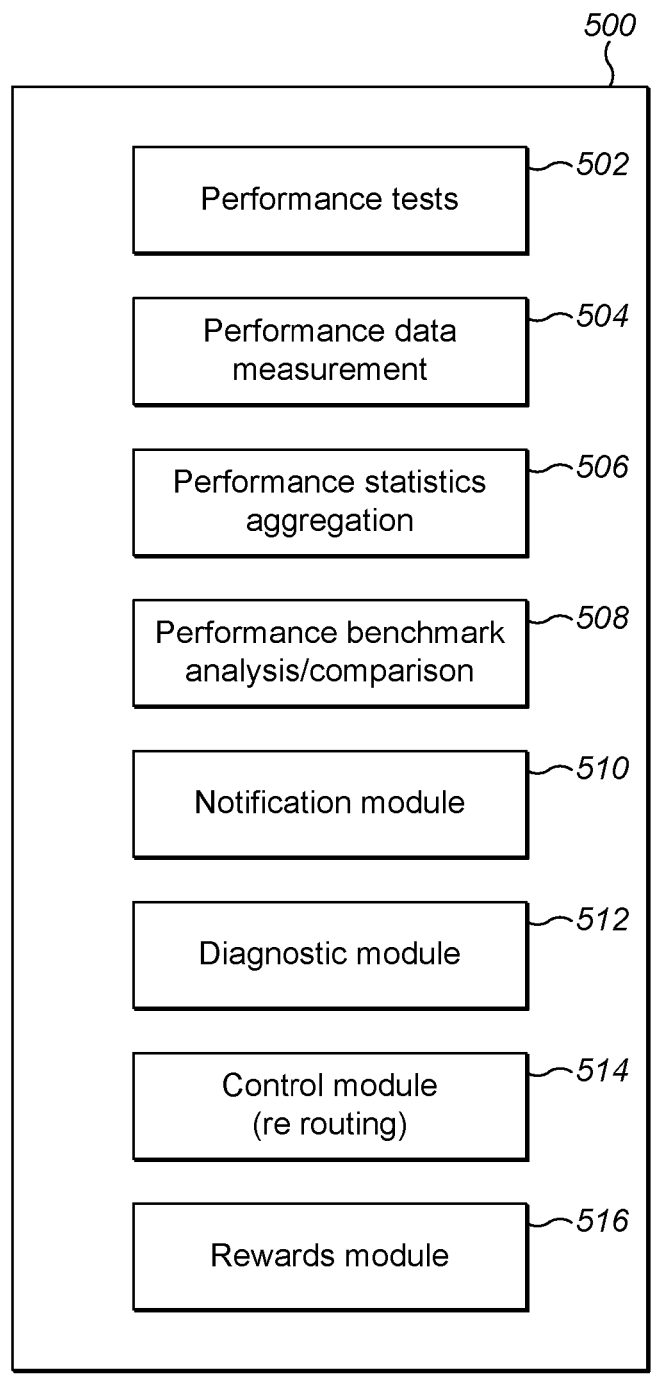
FIG. 5 is a schematic diagram of an example QRF system according to the invention.

FIG. 5 is a schematic diagram illustrating an example QRF DLN system 500 for regulating and operating a distributed ledger network (DLN) according to the invention. The system 500 includes a performance tests module 502 configured to generate one or more performance tests, send one or more performance tests to selected nodes of the DLN and the like. The performance tests module 502 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for providing, selecting and sending one or more performance tests to one or more selected nodes of a group of nodes for acting as a trusted third party in a distributed ledger transaction and the like. The system 500 further includes an performance data measurement module 504 configured to receive responses from one or more selected nodes of a group of nodes, record timestamps associated with the performance tests and/or one or more test message(s) therein, and the like for use in generating performance data measurements associated with performance benchmarks and the like. The performance data measurement module 504 may include the functionality of the method(s), process(es), apparatus, node(s), QRF node(s), apparatus, and/or system(s) associated with the invention as described herein, modifications thereof, combinations thereof, and/or as described with reference to FIGS. 1a-4 for providing performance measurement data, operating performance data, performance data samples/instances and the like. The performance statistics aggregation module 506 may be configured for aggregating performance data measurements/samples/instances associated with a selected node from the group of nodes to form operating performance statistics for that selected node in relation to one or more performance benchmarks. The operating performance statistics may be aggregated over a predetermined time interval until it is determined enough samples or instances have been gather to allow comparison or assessment with the one or more operating performance benchmarks. The performance statistics aggregation module 506 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for aggregating and/or calculating operating performance statistics in relation to the performance benchmarks and the like.

The system 500 may further include performance benchmark analysis/assessment/comparison module 508 configured for determining whether a selected node from a group of nodes satisfy one or more performance benchmarks (e.g. network availability, transaction processing time, communication speed/bandwidth and the like) required for the selected node to act as a trusted third party node in a distributed ledger transaction. The performance benchmark analysis/assessment/comparison module 508 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for analysing, assessing and providing an indication of whether a selected node or one or more selected nodes from a group of nodes satisfy one or more performance benchmarks for acting as a trusted third party in a distributed ledger transaction and the like.

The system 500 may further include a notification module 510 configured to notifying one or more nodes and/or node operators associated with one or more nodes as to whether those nodes satisfy the performance benchmarks or not. The notification module 510 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for notifying said one or more nodes and/or node operators in relation to satisfying one or more performance benchmarks for acting as a trusted third party in a distributed ledger transaction and the like. The system 500 may further include a diagnosis module 512 configured to provide diagnosis data to one or more nodes and/or node operators associated with one or more nodes in relation to the nodes that do not satisfy the performance benchmarks; this may enable the nodes/node operators to re-configured/maintain the nodes to pass the performance tests/satisfy the PB(s) when re-tested. The notification module 512 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for providing diagnostics to nodes and/or node operators and the like. The system 500 may further include a control module (e.g. routing) module 514 configured to provide control to the distributed ledger network for re-routing transactions towards nodes satisfying the performance benchmarks. The control module 514 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for providing automatic routing of transaction traffic towards nodes satisfying the PBs and the like. The system 500 may further include a rewards module 516 configured to provide incentives and/or rewards in relation to nodes satisfying the performance benchmarks. The rewards module 516 may include the functionality of the method(s), process(es), apparatus, node(s), QRF node(s), apparatus, and/or system(s) associated with the invention as described herein, modifications thereof, combinations thereof, or as described herein, and/or as described with reference to any of FIGS. 1a-4 for providing incentives/rewards in relation to nodes satisfying the PBs and the like.

The system 500 may further include the functionality of the method(s), process(es), apparatus, nodes, and/or system(s) associated with the invention as described herein, combinations thereof, modifications thereof, variants thereof, and/or as described with reference to FIGS. 1a-4 for providing an indication to a distributed ledger network or system of whether nodes of a group of nodes satisfy performance benchmarks required for those nodes to act as trusted third party nodes in relation to distributed ledger transactions for one or more parties and the like.

In the embodiment(s) described above the DLN(s), method(s), apparatus, system(s) and/or computing system/device(s) may be implemented by a server, the server may comprise a single server or network of servers. In some examples the functionality of the server may be provided by a network of servers distributed across a geographical area, such as a worldwide distributed network of servers or cloud server network, and a user may be connected to an appropriate one of the network of servers based upon a user location.

The above description discusses embodiments of the invention with reference to a single user for clarity. It will be understood that in practice the system may be shared by a plurality of users, and possibly by a very large number of users simultaneously.

The embodiments described above are fully automatic. In some examples a user or operator of the system may manually instruct some steps of the method to be carried out.

In the described embodiments of the invention the system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions, method(s), process(es), QRF functionality, QRF process(es) and the like as described herein can be implemented in hardware, software, or any combination thereof. If implemented in software, the functions, method(s), process(es), QRF functionality, QRF process(es) and the like can be stored on or transmitted over as one or more instructions, program code or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. For example, a computer readable medium or tangible computer-readable storage media may include instructions and/or program code stored thereon, which when executed on a processor, causes the processor to implement the functions, method(s), process(es), QRF functionality, QRF process(es) and the like according to the invention; modifications thereof; combinations thereof; as described herein with reference to any of FIGS. 1 to 5. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and blu-ray disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

Although illustrated as a single system, it is to be understood that the computing device may be a distributed system. Thus, for instance, several devices may be in communication by way of a network connection and may collectively perform tasks described as being performed by the computing device.

Although illustrated as a local device it will be appreciated that the computing device may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements. As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something". Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims.

The invention claimed is:

1. A computer-implemented method for determining which of one or more nodes of a distributed ledger network satisfy one or more operating performance benchmark(s) required to operate as a trusted third party node, the distributed ledger network comprising a plurality of nodes, the plurality of nodes comprising a group of nodes, wherein each node in the group of nodes includes functionality for acting as a trusted third party node on a distributed ledger transaction, the method comprising:
performing a plurality of operating performance tests on one or more selected nodes of the group of nodes, wherein each operating performance test comprises sending a plurality of test messages to each selected node over a predetermined time period, and
wherein each selected node receives the plurality of operating performance tests at random or pseudo-random time instances over the predetermined time period to maximize probability of normal node performance;
receiving, as a result of the operating performance tests, operating performance data associated with each selected node;
aggregating operating performance statistics for each selected node based on the received operating performance data; and
indicating to the distributed ledger network those selected nodes satisfying the one or more operating performance benchmark(s) for acting as a trusted third party for distributed ledger transactions over the distributed ledger network based on the aggregated operating performance statistics.

2. The computer-implemented method as claimed in claim 1, wherein aggregating the operating performance statistics for each selected node further comprises calculating the operating performance statistics for each selected node based on the frequency at which the received operating performance data associated with the selected node satisfy corresponding target operating performance thresholds in relation to the operating performance benchmark(s).

3. The computer-implemented method as claimed in claim 1, wherein the operating performance data comprises one or more measurable operational parameters associated with the selected node receiving and processing the test messages.

4. The computer-implemented method as claimed in claim 1, wherein the operating performance data associated with the selected node in relation to the test messages comprises at least one or more measurable operational parameters based on the group of:
test message transmission timestamps;
test message reception timestamps;
latency delays;
uptime of a selected node;
transaction processing speed; and
round-trip-time between one or more nodes associated with the parties and the selected node in relation to the test message.

5. The computer-implemented method as claimed in claim 1, wherein operating performance benchmark(s) comprise one or more performance benchmark(s) based on the group of:
a selected node meeting an availability threshold for the selected node to authorize transactions;
a selected node meeting an uptime threshold for the selected node to authorize transactions;
a selected node meeting a network reachability threshold;
a selected node meeting an communication connection speed threshold;
a selected node meeting a transaction processing time threshold; and
a selected node meeting any other operating performance threshold externally determinable or measurable to the selected node for determining the operating performance of the selected node.

6. The computer-implemented method as claimed in claim 1, further comprising:
determining a selected node satisfies the operating performance benchmark(s) when the operating performance statistics indicate the selected node meets or exceeds a quality metric for each of the operating performance benchmark(s).

7. The computer-implemented method as claimed in claim 6, wherein the quality metric is based on a frequency or number of times the selected node satisfies the corresponding operating performance benchmark in relation to the number of test messages received.

8. The computer-implemented method as claimed in claim 6, wherein the quality metric is based on a percentage of a time interval, or number of test messages received/sent, the selected node satisfies a performance benchmark of at least 95%.

9. The computer-implemented method as claimed in claim 6, wherein the quality metric is based on a probability over a time interval, or number of test messages received/sent, that the selected node satisfies a performance benchmark.

10. The computer-implemented method as claimed in claim 1, wherein one or more of the test messages comprises a diagnostic test transaction between two or more parties requiring a node from the group of nodes to act as a third party node,
wherein, on receipt of the test message, a selected node from the group of nodes processes the diagnostic test transaction as a third party node between the two or more parties.

11. The computer-implemented method as claimed in claim 10, wherein the two or more parties exist or are based on the same node in the distributed ledger network.

12. The computer-implemented method as claimed in claim 10, wherein the two or more parties exist or are based on different nodes of the distributed ledger network.

13. The computer-implemented method as claimed in claim 1, wherein one or more of the test messages comprises one or more network reachability messages based from the group of:
ping messages for determining reachability of the selected node;
keep-alive messages for determining a communication link exists with the selected node;
any other message or messaging protocol for determining round-trip time in relation to the selected node; and
any other message or messaging protocol for determining end-to-end delay or one-way delay in relation to the selected node.

14. The computer-implemented method as claimed in claim 13, wherein the one or more test messages and responses thereto are configured to determine an estimate of the availability of the selected node for performing transactions of the selected node based determining an end-to-end delay between a party of the two or more parties initiating the transaction with the selected node.

15. The computer-implemented method as claimed in claim 10, wherein the one or more test messages and responses thereto are configured to determine an estimate of the transaction processing time of the selected node in relation to a diagnostic test transaction based on round-trip time of the transaction being performed between the two or more parties and the selected node and the end-to-end delay between the two or more parties and the selected node.

16. The computer-implemented method as claimed in claim 13, wherein the one or more test messages and responses thereto are configured to determine an estimate of the communication bandwidth for the connection to the selected node in the distributed ledger network based determining an round-trip-time and/or end-to-end delay between the two or more parties in a transaction with the selected node.

17. The computer-implemented method as claimed in claim 1, wherein the group of nodes comprises:
a plurality of subgroup of nodes, each subgroup of nodes associated with a corresponding node operator and each node in the subgroup of nodes operating independently of other nodes in the subgroup of nodes, and
wherein the method further comprises:
sending a notification to each node operator as to whether those selected nodes of the subgroup of nodes associated with the node operator satisfy the operating performance benchmark(s).

18. The computer-implemented method as claimed in claim 17, wherein the notification comprises diagnostic data representative of the operating performance statistics of the selected nodes in the subgroup of nodes.

19. The computer-implemented method as claimed in claim 18, wherein the diagnostic data indicates whether a selected node satisfies the operating performance test.

20. The computer-implemented method as claimed in claim 1, wherein the group of nodes comprises:
a plurality of subgroups of nodes, each subgroup of nodes associated with a corresponding node operator and each node in the subgroup of nodes operating independently of other nodes in the subgroup of nodes, and
wherein the method further comprises:
notifying a node operator of those selected nodes in the subgroup of nodes that do not satisfy all of the operating performance benchmark(s).

21. The computer-implemented method as claimed in claim 1, wherein the group of nodes comprises:
a plurality of subgroups of nodes, each subgroup of nodes associated with a corresponding node operator and each node in the subgroup of nodes operating independently of other nodes in the subgroup of nodes, and
wherein the method further comprises:
rewarding a node operator by providing a number of tokens to the node operator based on the number of selected nodes in the subgroup of nodes that satisfy all of the operating performance benchmark(s).

22. The computer-implemented method as claimed in claim 1, wherein indicating to the distributed ledger network those selected nodes satisfying one or more operating performance benchmark(s) further comprises ensuring transactions are routed to those selected nodes satisfying one or more operating performance benchmark(s).

23. The computer-implemented method as claimed in claim 22, wherein ensuring transactions are routed further comprises:
configuring the distributed ledger network to re-route transactions away from those selected nodes indicated as not satisfying one or more of the operating performance benchmark(s).

24. The computer-implemented method as claimed in claim 1, wherein indicating to the distributed ledger network those selected nodes satisfying one or more operating performance benchmark(s) further comprises:
storing, in a blockchain or distributed ledger, the operating performance statistics for each of the selected nodes and/or whether each of the selected nodes satisfies the one or more operating performance benchmark(s),
wherein the blockchain or distributed ledger is accessed by one or more parties of a transaction for selecting a node that satisfies the operating performance benchmark(s) required for acting as a third party node in the transaction.

25. The computer-implemented method as claimed in claim 1, wherein the group of nodes comprises at least one type of node from the group of:
- a super-peer node;
- a master node;
- a miner node;
- a jury node; and
- a notary nodes.

26. The computer-implemented method as claimed in claim 1, wherein the distributed ledger network is based on at least one of:
- a) a CORDA based distributed ledger network and the group of nodes comprises a pool of notary nodes;
- b) blockchain based distributed ledger network and the group of nodes comprises a pool of miner nodes; and
- c) any other type of distributed ledger network in which a group of nodes comprises nodes for acting as trusted third parties in a distributed ledger transaction for one or more parties.

27. A node in a distributed ledger network comprising a plurality of nodes, the plurality of nodes comprising a group of nodes, wherein each node in the group of nodes includes functionality for acting as a third party node in a transaction, the node configured to implement the computer-implemented method according to claim 1.

* * * * *